(12) United States Patent
Akiyama

(10) Patent No.: US 10,444,117 B2
(45) Date of Patent: Oct. 15, 2019

(54) RESONANCE SUPPRESSION CONTROL CIRCUIT AND TESTING SYSTEM EMPLOYING SAME, AND METHOD OF DESIGNING RESONANCE SUPPRESSION CONTROL CIRCUIT

(71) Applicant: MEIDENSHA CORPORATION, Tokyo (JP)

(72) Inventor: Takao Akiyama, Tokyo (JP)

(73) Assignee: MEIDENSHA CORPORATION, Tokyo (JP)

( * ) Notice: Subject to any disclaimer, the term of this patent is extended or adjusted under 35 U.S.C. 154(b) by 0 days.

(21) Appl. No.: 16/312,961

(22) PCT Filed: Jun. 19, 2017

(86) PCT No.: PCT/JP2017/022496
§ 371 (c)(1),
(2) Date: Dec. 21, 2018

(87) PCT Pub. No.: WO2017/221876
PCT Pub. Date: Dec. 28, 2017

(65) Prior Publication Data
US 2019/0219481 A1    Jul. 18, 2019

(30) Foreign Application Priority Data

Jun. 22, 2016 (JP) .................................. 2016-123682

(51) Int. Cl.
*G01M 15/02*    (2006.01)
*G01M 13/025*    (2019.01)
(Continued)

(52) U.S. Cl.
CPC .......... *G01M 13/025* (2013.01); *G01M 15/02* (2013.01); *G01M 15/044* (2013.01); *G05B 13/04* (2013.01); *H02P 6/08* (2013.01)

(58) Field of Classification Search
CPC .. G01M 13/025; G01M 15/044; G01M 15/02; G05B 13/04; H02P 6/08
See application file for complete search history.

(56) References Cited

U.S. PATENT DOCUMENTS 6,434,454 B1* 8/2002 Suzuki ................. G01M 15/02
                                                       701/32.9
6,768,940 B2* 7/2004 Akiyama ............ G01M 15/044
                                                       701/114
(Continued)

FOREIGN PATENT DOCUMENTS

JP    2002-071520 A    3/2002
JP    2002-206991 A    7/2002
(Continued)

*Primary Examiner* — Freddie Kirkland, III
(74) *Attorney, Agent, or Firm* — Muncy, Geissler, Olds & Lowe, P.C.

(57) ABSTRACT

A resonance suppression control circuit provides operation stable for variations with a low order mode of vibration and suppressing spill-over due to high order mode of vibration. This circuit controls a physical system having two or more modes of vibration, and suppresses resonance in a lowest order mode of vibration from among the plurality of modes. The circuit has a controller designed by a μ design method, using a generalized plant with nominal model, and structured perturbation to the generalized plant. The nominal model is represented by the product of a low order vibration mode transfer function having the low order mode of vibration to be suppressed, and a high order vibration mode transfer function having a high order mode of vibration. The structured perturbation includes a first parameter perturbation term which imparts a multiplicative error to a spring constant included in the vibration mode transfer function being suppressed.

20 Claims, 26 Drawing Sheets

(51) Int. Cl.
*G05B 13/04* (2006.01)
*H02P 6/08* (2016.01)
*G01M 15/04* (2006.01)

(56) References Cited

U.S. PATENT DOCUMENTS

| | | | |
|---|---|---|---|
| 9,207,149 B2* | 12/2015 | Kanke | G01M 17/007 |
| 9,632,007 B2* | 4/2017 | Bauer | G01M 13/025 |
| 9,689,774 B2* | 6/2017 | Kanke | B60L 50/10 |
| 9,739,687 B2* | 8/2017 | Akiyama | G01M 15/02 |
| 2002/0091471 A1 | 7/2002 | Suzuki | |
| 2003/0088345 A1 | 5/2003 | Akiyama et al. | |
| 2015/0013443 A1 | 1/2015 | Kanke | |
| 2016/0109328 A1 | 4/2016 | Kanke et al. | |

FOREIGN PATENT DOCUMENTS

| | | |
|---|---|---|
| JP | 2003-149085 A | 5/2003 |
| JP | 2010-071772 A | 4/2010 |
| WO | WO 2013/105375 A1 | 7/2013 |
| WO | WO 2014/175203 A1 | 10/2014 |
| WO | WO 2015/136626 A1 | 9/2015 |

* cited by examiner

RESONANCE SUPPRESSION CONTROL CIRCUIT AND TESTING SYSTEM EMPLOYING SAME, AND METHOD OF DESIGNING RESONANCE SUPPRESSION CONTROL CIRCUIT

TECHNICAL FIELD

The present invention relates to a resonance suppression control circuit with a physical system having a plurality of vibration modes as a control target which suppresses resonance in at least one vibration mode among this plurality of vibration modes, a test system using this resonance suppression control circuit, and a method of designing this resonance suppression control circuit.

BACKGROUND ART

Drive train refers to an abbreviation for a plurality of devices for transferring energy generated by an engine to drive wheels, and is configured by an engine, clutch, transmission, drive shaft, propeller shaft, differential gear, drive wheels, etc. In performance evaluation testing of a drive train, the durability performance, quality, etc. thereof are evaluated by actually continuously driving the transmission by the engine. In recent years, as a system which performs such testing of drive trains, a system has been presented which causes the drive torque inputted on a workpiece to be generated by a motor instead of an actual engine (for example, refer to Patent Document 1).

Since periodic torque fluctuation arises due to the combustion cycle of each cylinder in the actual engine, with the system illustrated in the above-mentioned Patent Document 1, the drive torque generated by the motor is pseudo fluctuated by summing the alternating current component by a sine wave in the direct current component for generating constant drive torque.

However, since a unique vibration mode characterized by a prescribed resonance frequency exists in the above-mentioned such test system configured by joining the test piece and a dynamometer by a shaft, if causing the torque current command signal to the motor to fluctuate periodically, when the frequency thereof passes through the unique resonance frequency in the test system, it may induce resonance vibration. Therefore, with the test system of Patent Document 2, the occurrence of such resonance is suppressed by generating a torque current command signal using a resonance suppression control circuit designed using a control system design method such as H∞ control or μ design.

Patent Document 1: Japanese Unexamined Patent Application, Publication No. 2002-71520
Patent Document 2: PCT International Publication No. WO2015/136626

DISCLOSURE OF THE INVENTION

Problems to be Solved by the Invention

Herein, there are several problems in the resonance suppression control circuit shown in Cited Document 2. First, the resonance frequency of a vibration mode serving as the suppression target somewhat fluctuates depending on various factors; however, the resonance suppression control circuit of Patent Document 2 does not consider the above such fluctuation in resonance frequency in the design stage thereof. Herein, as a factor inducing fluctuation in the resonance frequency serving as the suppression target, a case of the mechanical characteristic thereof varying from that assumed at the design stage due to the test piece being exchanged; a case of the inertial moment thereof varying due to the state of the test piece (e.g., case of establishing the drive train of an AT vehicle including a torque converter as the test piece, existence/lack of a lockup function thereof); etc. can be exemplified. For this reason, in the resonance suppression control circuit of Patent Document 2, the control may become unstable due to the above such fluctuation in resonance frequency.

Second, the resonance suppression control circuit shown in Patent Document 2 is designed with a model approximating a physical system by a so-called two-inertia system configured by linking two rigid bodies by a spring as the nominal model; however, this two-inertia system only has one vibration mode theoretically. However, since a plurality of vibration modes exist in the actual physical system, when applying the resonance suppression control circuit designed with such a two inertial system as the nominal model to an actual physical system, spillover in which control becomes unstable may occur by the influence of a plurality of high-order resonance modes which were ignored during design.

However, in order to solve the first problem, it has been considered to define a perturbation term relative to a parameter affecting the variation in resonance frequency among the plurality of parameters constituting the nominal mode, and to construct a resonance suppression control circuit in which robust stability relative to such variation in resonance frequency is assured by the μ design method. In addition, in order to solve the second problem, it has been considered to expand the nominal model to a multi-inertia system of at least three having a plurality of vibration modes. However, it has been considered difficult to solve these two problems at the same time. In other words, with the two-inertia system defined in Patent Document 2, since the resonance frequency of the vibration mode varies depending on spring stiffness or moment of inertia, it is relatively easy to introduce a perturbation term made assuming the variation in resonance frequency to solve the first problem. However, if expanding the nominal model to a multi-inertial system of at least three in order to solve the second problem, since the variation in resonance frequency of each vibration mode has a correlation with many parameters constituting the multi-inertial system, the introduction of a perturbation term made assuming the variation in the resonance frequency is not easy, and thus solving the first problem becomes difficult.

The present invention was made taking account of the above such problems, and has an object of providing a resonance suppression control circuit which can suppress spillover due to high-order vibration mode, at the same time as providing stable operation with respect to variation in a low-order vibration mode.

Means for Solving the Problems

A resonance suppression control circuit (for example, the resonance suppression control circuit 5 described later) according to a first aspect of the present invention which, establishing a physical system having a plurality of at least two vibration modes configured by connecting an electric motor (for example, the drive motor 2 described later) and a test piece (for example, the test piece W described later) by a shaft, suppresses resonance in at least one vibration mode among the plurality of vibration modes by applying an input to the electric motor, the resonance suppression control circuit including a controller (for example, the $Gc1(s)$, Gc2(s) described later) designed by way of a control system design method designated as μ design method using a generalized plant (for example, the generalized plant P1 to P12 described later) which includes a nominal model (for example, the nominal model N1 to N12 described later) imitating input/output characteristics of the control target from an input of the electric motor until shaft torque of the shaft, and a structured perturbation (for example, the structured perturbation Δ described later) relative to the generalized plant, in which the nominal model defines one among the plurality of vibration modes (for example, the low-order vibration mode R1 described later) as a suppression target, and is represented by the product of a suppression target vibration mode transfer function (for example, the low-order vibration mode transfer functions M1(s), M2(s) described later) having a vibration mode (for example, the low-order vibration mode R1 described later) of the suppression target, and a high-order vibration mode transfer function (for example, the high-order vibration mode transfer function Hx(s) described later) having a vibration mode (for example, the high-order vibration modes R2, R3 described later) which is higher order than the vibration mode of the suppression target, and in which the structured perturbation includes at least one perturbation term (for example, the first parameter perturbation term 61 and second parameter perturbation term 62 described later) relative to a parameter (for example, the spring constants K1, K2, unit moment of inertia J, first moment of inertia J1 and second moment of inertia J2 described later) included in the suppression target vibration mode transfer function.

According to a second aspect of the present invention, in this case, it is preferable for a transfer function (for example, the low-order vibration mode transfer function M1(s) described later) from an input to an inertia field until an output of a shaft element in a one-degree-of-freedom vibration system configured by connecting the inertia field having a predetermined moment of inertia (for example, the unit moment of inertia J described later) and a solid wall by the shaft element having a predetermined spring constant (for example, the spring constant K1 described later) and damping constant (for example, the damping constant C1 described later), to be used in the suppression target vibration mode transfer function.

According to a third aspect of the present invention, in this case, it is preferable for the structured perturbation to include a perturbation term (for example, the first parameter perturbation term δ1 described later) relative to the spring constant (for example, the spring constant K1 described later).

According to a fourth aspect of the present invention, in this case, it is preferable for the structured perturbation to include a perturbation term (for example, the first parameter perturbation term δ1 described later) relative to the moment of inertia (for example, the unit moment of inertia J described later).

According to a fifth aspect of the present invention, in this case, it is preferable, when defining a pole of the suppression target vibration mode transfer function as "$p_R$" and defining a complex conjugate thereof as "$p_R^*$", for the spring constant K1, the damping constant C1 and the suppression target vibration mode transfer function M1(s) to be represented by Formula (1) below.

$$K1 = p_R \cdot p_R^*, \; C1 = -(p_R + p_R^*), \; M1(s) = \frac{C1 \cdot s + K1}{(s - p_R) \cdot (s - p_R^*)} \quad (1)$$

According to a sixth aspect of the present invention, in this case, it is preferable for a transfer function (for example, the low-order vibration mode transfer function M2(s) described later) from an input to a first inertia field until an output of a shaft element in a two inertia system configured by connecting the first inertia field having a predetermined first moment of inertia (for example, the first moment of inertia J1 described later) and a second inertia field having a predetermined second moment of inertia (for example, the second moment of inertia J2 described later) by the shaft element having a predetermined spring constant (for example, the spring constant K2 described later) and damping constant (for example, the damping constant C2 described later), to be used in the suppression target vibration mode transfer function.

According to a seventh aspect of the present invention, in this case, it is preferable for the structured perturbation to include a perturbation term (for example, the first parameter perturbation term δ1 described later) relative to the spring constant (for example, the spring constant K2 described later).

According to an eighth aspect of the present invention, in this case, it is preferable for the structured perturbation to include a perturbation term (for example, the first parameter perturbation term δ1 described later) relative to the second moment of inertia (for example, the second moment of inertia J2 described later).

According to a ninth aspect of the present invention, in this case, it is preferable for the structured perturbation to include a perturbation term (for example, the first parameter perturbation term δ1 described later) relative to the first moment of inertia (for example, the first moment of inertia J2 described later).

According to a tenth aspect of the present invention, in this case, it is preferable for the structured perturbation to include a perturbation term (for example, the first parameter perturbation term δ1 described later) relative to the spring constant (for example, the spring constant K2 described later) and a perturbation term (for example, the second parameter perturbation term δ2 described later) relative to the second moment of inertia (for example, the second moment of inertia J2 described later).

According to an eleventh aspect of the present invention, in this case, it is preferable, when defining a pole of the suppression target vibration mode transfer function as "pR", defining a complex conjugate thereof as "pR*", defining the first moment of inertia as "J1" and defining the second moment of inertia as "J2", for the spring constant K2, the damping constant C2 and the suppression target vibration mode transfer function M2(s) to be represented by Formula (2) below.

$$K2 = \frac{p_R \cdot p_R^*}{\frac{1}{J1} + \frac{1}{J2}}, \; C2 = -\frac{p_R + p_R^*}{\frac{1}{J1} + \frac{1}{J2}}, \; M2(s) = \frac{1}{J1} \cdot \frac{C2 \cdot s + K2}{(s - p_R) \cdot (s - p_R^*)} \quad (2)$$

According to a twelfth aspect of the present invention, in this case, it is preferable for the high-order vibration mode transfer function to be identified so that a transfer function obtained by multiplying this high-order vibration mode transfer function and the suppression target vibration mode transfer function matches a transfer function from an input to the electric motor of the suppression target until a shaft torque of the shaft.

A test system (for example, the test system S described later) according to a thirteenth aspect of the present invention includes: an electric motor (for example, the drive motor 2 described later) which is connected with a test piece (for example, the test piece W described later) via a shaft (for example, the connecting shaft S1 described later); a shaft torque meter (for example, the shaft torque meter 6 described later) which detects shaft torque generated at the shaft; an inverter (for example, the inverter 3 described later) which supplies electric power to the electric motor; and a resonance suppression control circuit (for example, the resonance suppression control circuit 5 described later) which generates, using a command signal relative to generated torque of the electric motor and a detection signal of the shaft torque meter, a torque current command signal to the electric motor so that resonance of the shaft is suppressed, and then inputs the torque current command signal to the inverter, in which a resonance suppression control circuit as described in any one of the first to twelfth aspects is used as the resonance suppression control circuit.

A resonance suppression control circuit (for example, the resonance suppression control circuit 5 described later) according to a fourteenth aspect of the present invention has a function of establishing a physical system configured by connecting an electric motor (for example, the drive motor 2 described later) and a test piece (for example, the test piece W described later) by a shaft (for example, the connecting shaft S1 described later), and having a plurality of at least two vibration modes as a control target, and suppressing resonance in at least one vibration mode among the plurality of vibration modes by applying an input to the electric motor. A method of designing a resonance suppression control circuit having such functions includes: defining one among the plurality of vibration modes as a suppression target, and stipulating a generalized plant (for example, the generalized plant P1 to P12 described later) which includes nominal model (for example, the nominal model N1 to N12 described later) imitating input/output characteristics of the control target from an input to the electric motor until a shaft torque of the shaft, by a product of a suppression target vibration mode transfer function (for example, the low-order vibration mode transfer function M1($s$), M2($s$) described later) having a vibration mode of the suppression target, and a high-order vibration mode transfer function (for example, the high-order vibration mode transfer function Hx(s) described later) having a vibration mode which is higher order than the vibration mode of the suppression target; stipulating a structured perturbation (for example, the structured perturbation Δ described later) which includes at least one perturbation term (for example, the first parameter perturbation term δ1 and second parameter perturbation term δ2 described later) relative to a parameter included in the suppression target vibration mode transfer function in the generalized plant; and designing the resonance suppression control circuit by way of a suppression system design method designated as μ design method using the stipulated generalized plant and structured perturbation.

Effects of the Invention

The present invention represents the nominal model which imitates the input/output characteristics from an input to the electric motor until the output of the shaft torque in the control target having a plurality of vibration modes, by the product of the suppression target vibration mode transfer function having the vibration mode serving as the suppression target, and the high-order vibration mode transfer function having a vibration mode of higher order than this suppression target vibration mode. Then, the resonance suppression control circuit is designed by the μ design method using the generalized plant having the nominal model encompassing both the suppression target vibration mode and high-order vibration mode in this way, and the structured perturbation relative to this generalized plant. According to the resonance suppression control circuit of the present invention, it is thereby possible to suppress spillover due to the high-order vibration mode. In addition, the present invention, upon separating the nominal model into the suppression target vibration mode transfer function and high-order vibration mode transfer function in the aforementioned way, includes at least one perturbation term relative to a parameter included in the suppression target vibration mode transfer function encompassing the suppress target vibration mode among these two transfer functions, in the structured perturbation. By introducing such a perturbation term, according to the present invention, it is possible to construct a resonance suppression control circuit for which robust stability is ensured relative to variation in the resonance frequency of the suppression target vibration mode.

Herein, the significance of separating the nominal model into two transfer functions will be explained. In general, the input/output characteristics of a physical system serving as the control target can be expressed by a simple transfer function so long as using a known system identification method. However, in the case of the control target having a plurality of vibration modes, the function form of the transfer function identified in this way has a higher number of orders, and the correlation between the plurality of parameters constituting the transfer function and the resonance frequency of the suppression target vibration mode becomes complex. For this reason, it is difficult to extract only a parameter having a correlation with this resonance frequency and set the perturbation term to this parameter, for considering the variation in resonance frequency of the suppression target vibration modes. In contrast, by expressing the nominal model in the above-mentioned way by the product of the suppression target vibration mode transfer function and the high-order vibration mode transfer function, since the present invention can express the function form of the suppression target vibration mode transfer function in a simple form of low order, it is easy to extract a parameter having a correlation with the resonance frequency of the suppression target vibration mode, and thus setting of the perturbation term becomes easy. According to the resonance suppression control circuit of the present invention, it is thereby also possible to suppress spillover due to high-order vibration mode, while at the same time providing operation that is stable with respect to variations in resonance frequency of a low-order mode of vibration.

The present invention uses a transfer function from an input to the inertia field to the output of the shaft element in a one-degree-of-freedom vibration system configured by connecting the inertia field and a solid wall by a shaft element having a predetermined spring constant and damping constant, as the suppression target vibration mode transfer function. Since it is thereby possible to express the suppression target vibration mode transfer function by a simple function form of low order, setting of a perturbation term for considering the variation in resonance frequency of the suppression target vibration mode serving as the suppression target can be done easily.

The magnitude of the resonance frequency in the aforementioned one-degree-of-freedom vibration system has a correlation with the magnitude of the spring constant, and thus the present invention sets the perturbation term relative to such a spring constant. It is thereby possible to construct a resonance suppression control circuit for which robust stability is ensured relative to variation in the resonance frequency of the suppression target vibration mode.

The magnitude of the resonance frequency in the aforementioned one-degree-of-freedom vibration system has a correlation with the magnitude of the moment of inertia, and thus the present invention sets the perturbation term relative to such a moment of inertia. It is thereby possible to construct a resonance suppression control circuit for which robust stability is ensured relative to variation in the resonance frequency of the suppression target vibration mode.

The present invention defines the pole of the suppression target vibration mode transfer function corresponding to the resonance point of the suppression target vibration mode as "pR", and defines the complex conjugate thereof as "pR*", and using these, configures the suppression target vibration mode transfer function M1($s$), spring constant K1 and damping constant C1 as in Formula (1) above. By establishing the suppression target vibration mode transfer function as such a simple configuration, the present invention can easily set the perturbation term for considering the variation in resonance frequency of the suppress target vibration mode.

The present invention uses a transfer function from an input to the first inertia field until an output of the shaft element in a two inertia system configured by connecting the first inertia field and the second inertia field by the shaft element having a predetermined spring constant and damping constant, as the suppression target vibration mode transfer function. Since it is thereby possible to express the suppression target vibration mode transfer function by a simple function form of low order, setting of a perturbation term for considering the variation in resonance frequency of the suppression target vibration mode serving as the suppression target can be done easily.

The magnitude of the resonance frequency in the aforementioned two inertia system has a correlation with the magnitude of the spring constant, and thus the present invention sets the perturbation term relative to such a spring constant. It is thereby possible to construct a resonance suppression control circuit for which robust stability is ensured relative to variation in the resonance frequency of the suppression target vibration mode.

The magnitude of the resonance frequency in the aforementioned two inertia system has a correlation with the magnitude of the second moment of inertia, and thus the present invention sets the perturbation term relative to such a second moment of inertia. It is thereby possible to construct a resonance suppression control circuit for which robust stability is ensured relative to variation in the resonance frequency of the suppression target vibration mode.

The magnitude of the resonance frequency in the aforementioned two inertia system has a correlation with the magnitude of the first moment of inertia, and thus the present invention sets the perturbation term relative to such a first moment of inertia. It is thereby possible to construct a resonance suppression control circuit for which robust stability is ensured relative to variation in the resonance frequency of the suppression target vibration mode.

The magnitude of the resonance frequency in the aforementioned two inertia system has a correlation with the magnitudes of both the spring constant and the second moment of inertia, and thus the present invention sets the perturbation term relative to each of this spring constant and second moment of inertia. It is thereby possible to construct a resonance suppression control circuit for which robust stability is ensured relative to variation in the resonance frequency of the suppression target vibration mode.

The present invention defines the pole of the suppression target vibration mode transfer function corresponding to the resonance point of the suppression target vibration mode as "pR", defines the complex conjugate thereof as "pR*", defines the first moment of inertia as "J1", and further defines the second moment of inertia as "J2", and using these, configures the suppression target vibration mode transfer function M2($s$), spring constant K2 and damping constant C2 as in Formula (2) above. By establishing the suppression target vibration mode transfer function as such a simple configuration, the present invention can easily set the perturbation term for considering the variation in resonance frequency of the suppress target vibration mode.

The present invention identifies the high-order vibration mode transfer function so that a transfer function obtained by multiplying an unknown high-order vibration mode transfer function and a known suppression target vibration mode transfer function matches a measurable transfer function from an input to the electric motor until the shaft torque of the shaft in the control target. It is thereby possible to stipulate a nominal model which accurately imitates the input/output characteristic of the actual control target.

The present invention generates a torque current command signal relative to the electric motor using the resonance suppression control circuit of any one of the above (1) to (12), and inputs this to the inverter. It is thereby possible to also suppress the spillover due to the influence of high-order vibration mode while at the same time realizing stable control, even in a case of variations arising in the resonance frequency of the suppression target vibration mode of the test system due to the test piece being replaced or the state of the test piece changing.

The present invention expresses the nominal model imitating the input/output characteristics from an input to the electric motor until an output of the shaft torque in the control target having a plurality of vibration modes, by the product of the suppression target vibration mode transfer function having the vibration mode serving as the suppression target, and the high-order vibration mode transfer function having a vibration mode or higher order than this suppress target vibration mode. In addition, the present invention, upon separating the nominal model into the suppression target vibration mode transfer function and high-order vibration mode transfer function in the aforementioned way, includes at least one perturbation term relative to a parameter included in the suppression target vibration mode transfer function encompassing the suppress target vibration mode among these two transfer functions, in the structured perturbation. Then, the resonance suppression control circuit is designed by way of µ design using the generalized plant having such a nominal model, and the structured perturbation including the aforementioned such perturbation term. It is thereby possible to design a resonance suppression control circuit which can suppress spillover due to a high-order vibration mode, while at the same time providing stable operation with respect to variations in resonance frequency of the suppression target vibration mode.

PREFERRED MODE FOR CARRYING OUT THE INVENTION

Figure 1:
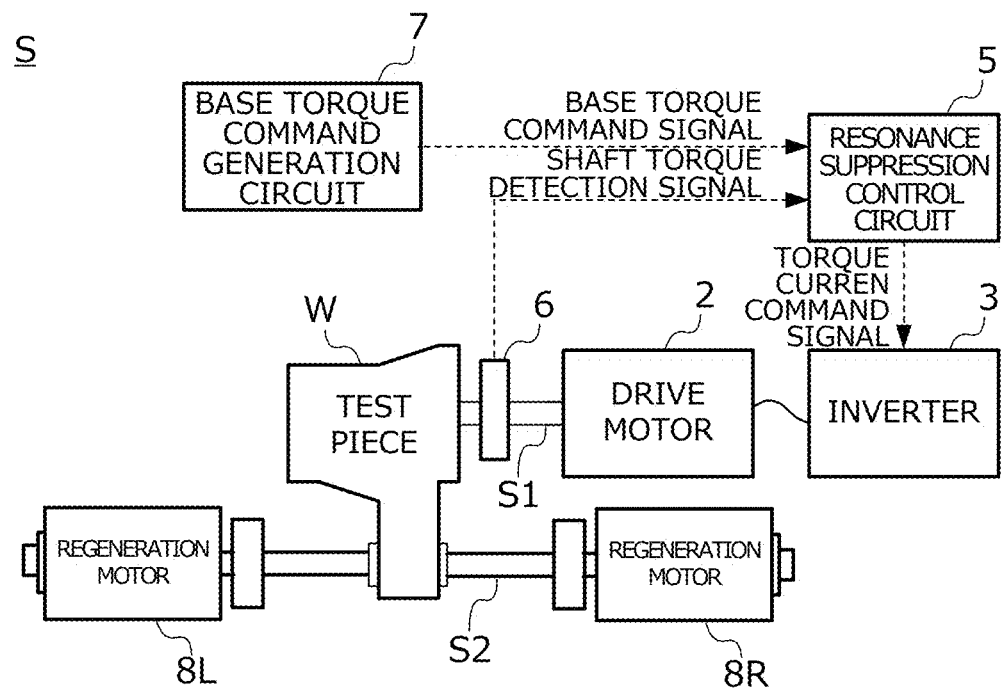
FIG. 1 is a view showing the configuration of a resonance suppression control circuit according to an embodiment of the present invention and a test system (3-axis type drive train bench system) including this.
Figure 2:
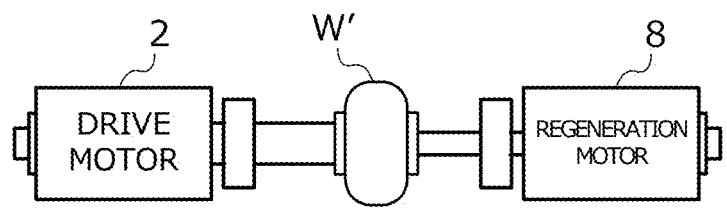
FIG. 2 is a view showing the configuration of a 2-axis type drive train bench system.

Hereinafter, an embodiment of the present invention will be explained in detail while referencing the drawings. FIG. 1 is a view showing the configuration of a resonance suppression control circuit 5 according to an embodiment of the present invention and a test system S including this. It should be noted that, hereinafter, a so-called drive train bench system will be explained in which a test piece W is a drive train of 3-axis type installed in a FF drive vehicle, as shown in FIG. 1; however, the present invention is not limited thereto. For example, as shown in FIG. 2, a test piece W' may be the drive train of 2-axis type installed to a FR drive vehicle.

The test system S includes a drive motor 2 which is connected with the test piece W by a connecting shaft S; an inverter 3 which supplies electric power to this drive motor 2; a shaft torque meter 6 which detects shaft torque generated at the connecting shaft S1; a resonance suppression control circuit 5 which generates a torque current command signal corresponding to a command related to torque generated by the drive motor 2; and a base torque command generation circuit 7 which generates a base torque command signal serving as the base of the above-mentioned torque current command signal.

The output shaft of the drive motor 2 is connected via the connecting shaft S1 with the input shaft of the test piece W, and makes it possible to transfer the power from the drive motor 2 to the test piece W. In addition, at both ends of a drive shaft S2 corresponding to the output shaft of the test piece W, regenerative motors 8L, 8R which generate load on the test piece W are connected. It should be noted that, at the test piece W' in FIG. 2, a regenerative motor 8 which generates load on the test piece W' is connected to a propeller shaft corresponding to the output shaft thereof. The shaft torque meter 6 detects the shaft torque generated at the connecting shaft S1, and inputs a shaft torque detection signal corresponding thereto to the resonance suppression control circuit 5. The inverter 3 drives the drive motor 2 according to the torque current command signal inputted from the resonance suppression control circuit 5.

The base torque command generation circuit 7 uses the drive motor 2 to resemble an engine connected to the test piece W, which is the drive train of a vehicle, and generates a base torque command signal imitating the engine torque. The base torque command generation circuit 7 generates a base torque command signal by superimposing an AC signal of a predetermined excitation frequency imitating the torque pulsation included in engine torque, on the DC signal of a predetermined magnitude.

The resonance suppression control circuit 5 generates a torque current command signal based on the base torque command signal generated by the base torque command generation circuit 7 and the shaft torque detection signal inputted from the shaft torque meter 6, and inputs this to the inverter 3.

According to the above such configuration, the test system S causes a pseudo-engine torque including fluctuations imitating the torque pulsations of the engine by the drive motor 2, and inputs this torque to the test piece W, whereby the durability performance, quality, etc. of this test piece W are evaluated.

Herein, the functions of the resonance suppression control circuit 5 will be explained. In the test system S, in the physical system configured by the inverter 3, drive motor, test piece W, connecting shaft S1 and shaft torque meter 6, a plurality of vibration modes of at least two (for example, refer to vibration modes R1, R2, R3, etc. in FIG. 7 described later) exists. On the other hand, the base torque command signal becomes a signal including the AC signal of excitation frequency imitating the torque pulsation in the above way. For this reason, when inputting the base torque command signal generated by the base torque command generation circuit 7 to the inverter 3 as is without passing through the resonance suppress control circuit 5, resonance may occur in the connecting shaft S1. The resonance suppression control circuit 5 defines at least one of the plurality of vibration modes assumed in the above-mentioned physical system, more specifically, the lowest-order vibration mode (for example, low-order vibration mode R1 in FIG. 7 described later) as the suppression target, and generates a torque current command signal from the base torque command signal so that the resonance is suppressed in this low-order vibration mode. In other words, the resonance suppression control circuit 5, when inserted between the base torque command generation circuit 7 and inverter 3 as shown in FIG. 1, generates the torque current command signal so as to lower the gain of the low-order vibration mode serving as the suppression target, in the I/O characteristic from the base torque command signal corresponding to the input to the above-mentioned physical system until the shaft torque detection signal corresponding to the output of the above-mentioned physical system, and then inputs to the inverter 3. Hereinafter, such a function of the resonance suppression control circuit 5 is also referred to as resonance suppression function.

Figure 3:
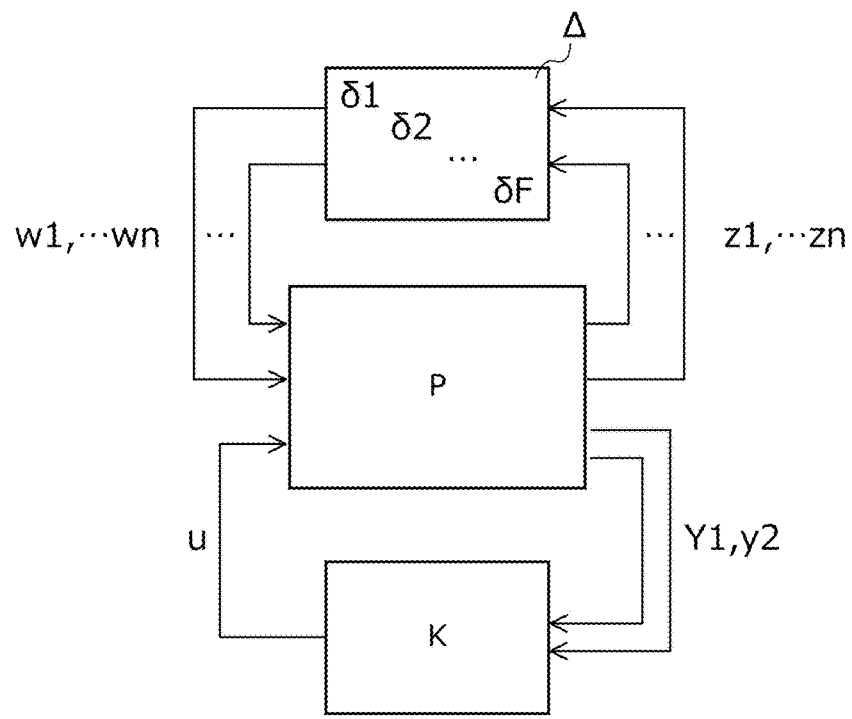
FIG. 3 is a block diagram showing the configuration of a feedback control system used upon designing a controller by the μ design method.

As the resonance suppression control circuit 5 including the above such resonance suppression function, a circuit configured by installing to an electronic computer a controller designed by the robust control design method called the $\mu$ design method in a feedback control system such as that shown in FIG. 3 can be used.

The feedback control system of FIG. 3 is configured by combining: a generalized plant P having a predetermined I/O characteristic between a plurality of inputs configured by external inputs w1, ..., wn (n is an integer of 2 or greater) and a control input u, and a plurality of outputs configured by control outputs z1, ..., zn and observation outputs y1, y2; a controller K applying control input u to the generalized plant P using the observation outputs y1, y2 of the generalized plant P; and structured perturbation $\Delta$ applying external inputs w1, ..., wn to the generalized plant P using the control outputs z1, ..., zn of the generalized plant P.

The generalized plant P establishes, as the control target, a physical system configured by the inverter 3, drive motor 2, connecting shaft S1, test piece W and shaft torque meter 6 of the test system S in FIG. 1, as explained in each example described later, and is configured by a nominal model imitating the I/O characteristic from the torque current command signal to the inverter 3 of this control target until the shaft torque detection signal of the shaft torque meter 6, and a plurality of weighting functions for reflecting the aforementioned resonance suppression function as a control function.

Figure 4:
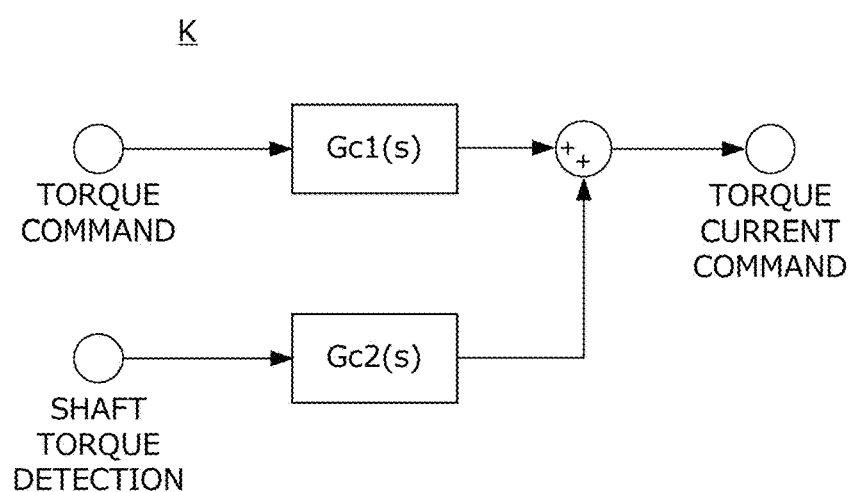
FIG. 4 is a block diagram showing the configuration of a controller derived by applying the μ design method to the feedback control system of FIG. 3.

FIG. 4 is a block diagram showing the configuration of a controller K derived by applying the $\mu$ design method to the feedback control system of FIG. 3. The controller K establishes a two-degree-of-freedom control system outputting a control input u corresponding to the torque current command signal from the two inputs consisting of the observation output y1 corresponding to the base torque command signal and the observation output y2 corresponding to the shaft torque detection signal, i.e. is configured by combining the transfer functions Gc1($s$) and Gc2($s$) as shown in FIG. 4.

Referring back to FIG. 3, the structured perturbation $\Delta$ is a complex matrix applying perturbation from the control outputs z1, ..., zn to the external inputs w1, ..., wn. This structured perturbation $\Delta$ includes at least one parameter perturbation term $\delta 1, \delta 2, ...$ applying fluctuation to at least one parameter included in the generalized plant P as a diagonal element thereof, and a virtual perturbation term 6F introduced in order to incorporate the evaluation of the robust control performance into the framework of $\mu$ design, and another nondiagonal element is 0.

In the $\mu$ design method, a feedback control system in which the structured perturbation $\Delta$ is set relative to a closed loop system configured by the generalized plant P and controller K as shown in FIG. 3 is defined, the controller K achieving the intended robust stability and robust control performance (i.e. transfer functions Gc1($s$) and Gc2($s$)) is designed by numeric operation, and this is used as the resonance suppression control circuit 5. More specifically, in the $\mu$ design method, by obtaining the controller K such that the value of the structured singular value p defined using the generalized plant P, structured perturbation $\Delta$ and controller K satisfies a predetermined condition, using an algorithm called D-K iteration, for example, a controller K which achieves robust stability and robust control performance is derived. It should be noted that, regarding a more specific sequence of deriving the controller K numerically by way of the $\mu$ design method, since it is explained in detail by Yasushi Liu, "Linear Robust Control", Corona Publishing Co., Ltd., 2002; "Control System Design by MATLAB", Tokyo Denki University Press, 1998, etc., a detailed explanation will be omitted herein. Hereinafter, the resonance suppression control circuit, and generalized plant required upon deriving this based on the $\mu$ design method will be explained for every example.

Example 1

Figure 5:
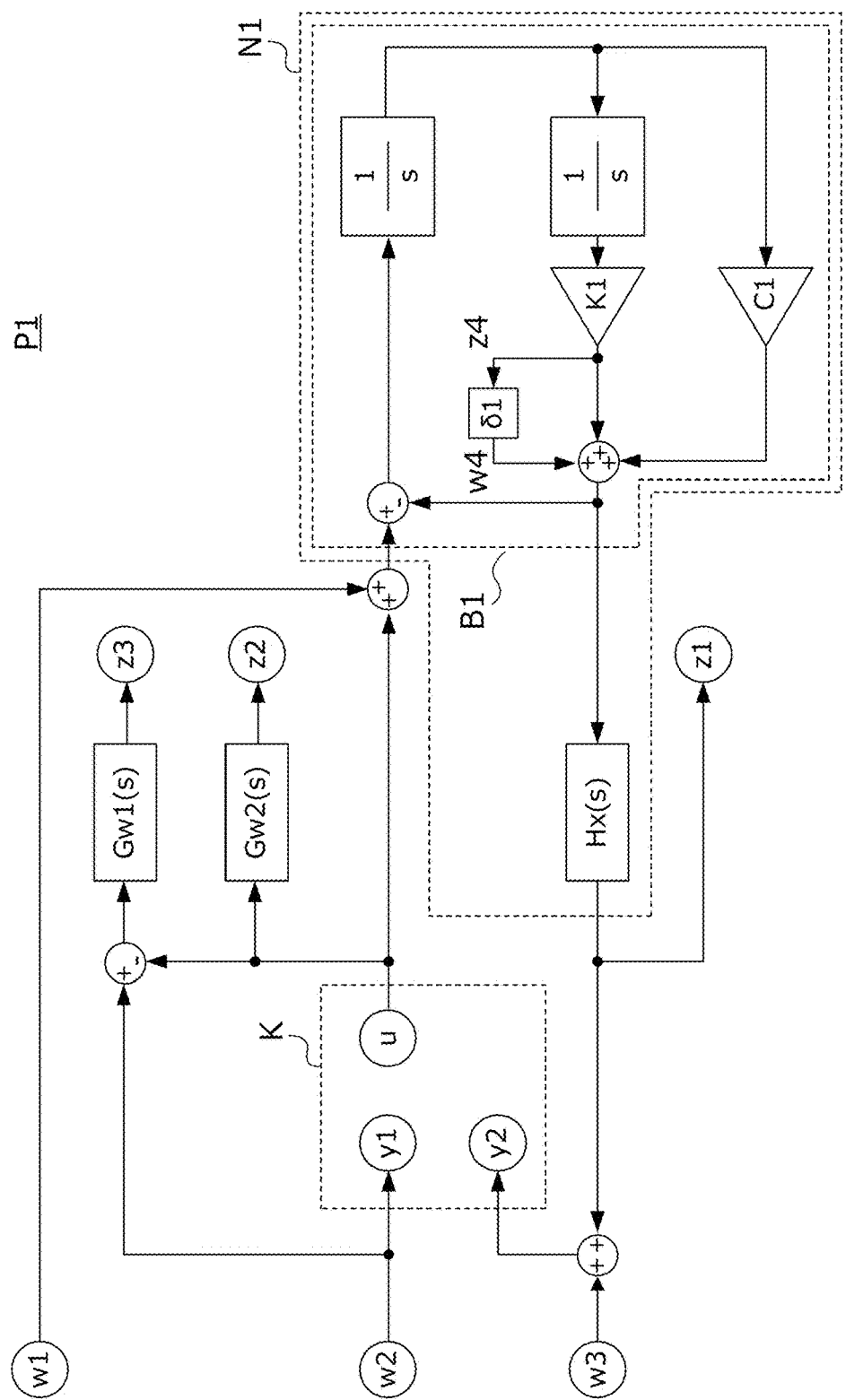
FIG. 5 is a view showing a specific configuration of a generalized plant used in the design of the resonance suppression control circuit of Example 1.

Next, a resonance suppression control circuit of Example 1 and the design method thereof will be explained. FIG. 5 is a view showing a specific configuration of a generalized plant P1 used in the design of the resonance suppression control circuit of Example 1.

The generalized plant P1 of Example 1 is configured by combining a nominal model N1 imitating the I/O characteristic from the torque current command signal of the control target until the shaft torque detection signal of the shaft torque sensor, and the plurality of weighting functions Gw1($s$) and Gw2($s$).

The transfer function G($s$) of the nominal model N1 defines the lowest order vibration mode among the plurality of vibration modes possessed by the control target as the suppression target in the aforementioned way, and is realized by the product (G($s$)=Hx($s$)×M1($s$)) of a low-order vibration mode transfer function M1(s) having this low-order vibration mode, and a high-order vibration mode transfer function Hx(s) having a vibration mode of higher order than the low-order vibration mode of the suppression target.

In a one-degree-of-freedom vibration system configured by connecting an inertia field having the unit moment of inertia J (hereinafter, set as J=1, omitting illustration thereof, etc.) and a rigid wall by an axial element having a predetermined spring constant K1 and damping constant C1, a transfer function from the torque acting on the inertia field until the torque generated at the axial element, and having a pole corresponding to the vibration mode of the suppression target is used as the low-order vibration mode transfer function M1(s). More specifically, in the case of defining the pole of the transfer function M1(s) as "$p_R$", and defining the complex conjugate thereof as "$p_R^*$", the spring constant K1, damping constant C1 and low-order vibration mode transfer function M1(s) are represented as in the following formula (3). In addition, this low-order vibration mode transfer function M1(s) is represented by the block B1 in the block diagram of FIG. 5.

$$K1 = p_R \cdot p_R^*, \ C1 = -(p_R + p_R^*), \ M1(s) = \frac{C1 \cdot s + K1}{(s - p_R) \cdot (s - p_R^*)} \quad (3)$$

As the high-order vibration mode transfer function Hx(s), a transfer function having a plurality of vibration modes of higher order than the low-order vibration mode of the suppression target is used. More specifically, the high-order vibration mode transfer function Hx(s) is identified by measuring transfer functions from the torque current command signal of an actual control target until the shaft torque detection signal, and using a known system identification method, so that this and the product Hx(s)×M1(s) of the two transfer functions match.

It should be noted that, upon identifying the high-order vibration mode transfer function Hx(s) in the above-mentioned way, the function form thereof is assumed by H1(s) or H2(s) shown in the following formula (4), for example. Herein, "b(s)" and "a(s)" in the following formula (4) are each polynomials of arbitrary orders with the highest order coefficient of 1. In addition, "g" in the following formula (4) is the highest order coefficient of a numerator polynomial, in the case of setting the highest order coefficient of a denominator polynomial of the transfer function G(s) of the nominal model N1 as 1. Each function of the denominator polynomial a(s) and numerator polynomial b(s) in the following formula (4), and the value of the highest order coefficient g are identified using the known system identification method as mentioned above, collectively with the value of the complex number $p_R$ representing the pole of the transfer function M1(s). It should be noted that although a case setting the specific function form of the high-order vibration mode transfer function Hx(s) as H1(s) will be explained hereinafter, it is not limited thereto, and the function form of Hx(s) may be set as H2(s). It should be noted that, in the case of setting the function form as H1(s), there is an advantage in that the reproducibility of the nominal model N1 improves, and in the case of setting the function form as H2(s), there is an advantage in that operation and implementation become easier by the amount by which being a lower order compared to H1(s).

$$H1(s) = \frac{g}{Cs + K} \cdot \frac{b(s)}{a(s)}, \ H2(s) = \frac{g}{K} \cdot \frac{b(s)}{a(s)} \quad (4)$$

The first external input w1 is an input signal for evaluating the torque control error of the inverter, and the first control output z1 is an output signal for evaluating the shaft torque detection signal. To the nominal model N1, a value produced by summing the first external input w1 and the control input u outputted from the controller K is inputted. In addition, in the first control output z1, the output signal of the nominal model N1 is used. The vibration mode included in the nominal model N1 is excited by the first external input w1. In addition, by the vibration mode being evaluated by the first control output z1, the resonance suppression control circuit such that the vibration mode included in the nominal model N1 declines is obtained.

The second external input w2 is an input signal corresponding to the base torque command signal, and is inputted to the controller K as the first observation output y1. The second control output z2 is an output signal obtained by multiplying a predetermined second weighting function Gw2(s) by the control input u outputted from the controller K. The specific function form of this second weighting function Gw2(s) is set so that the high-range gain of the resonance suppression control circuit declines.

The third external input w3 is an input signal corresponding to the noise in relation to the shaft torque detection signal. The total of summing the third external input w3 and the output signal of the nominal model N1 is inputted to the controller K as the second observation output y2. The third control output z3 is an output signal obtained by multiplying a predetermined first weighting function Gw1(s) by the deviation between the control input outputted from the controller K and the second external input w2. The specific function form of this first weighting function Gw1(s) is set so as to have an integral characteristic in a lower range than the low-order vibration mode serving as the suppression target. It is thereby possible to cause the gain of the resonance suppression control circuit in a lower range than the low-order vibration mode of the suppression target to decline.

The fourth external input w4 and fourth control output z4 are I/O signals set relative to the nominal model N1 in order to evaluate the influence due to fluctuation in resonance frequency of the low-order vibration mode serving as the suppression target, among the various errors between the actual control target and the nominal model N1 (hereinafter referred to as "model error"). This fourth external input w4 and fourth control output z4 are set so as to apply multiplicative error to this spring constant K1, at the output terminal of the spring constant K1 having a correlation with the magnitude of the resonance frequency of the low-order vibration mode, among the plurality of parameters included in the low-order vibration mode transfer function M1(s) having the low-order vibration mode as shown in FIG. 5.

In addition, in order to configure so that a resonance suppression control circuit is obtained that is robustly stable relative to the multiplicative error of the spring constant K1 which affects the variation directly on the resonance frequency of the low-order vibration mode, the first parameter perturbation term δ1 constituting one of the diagonal elements of the structured perturbation Δ is set between this fourth control output z4 and fourth external input w4 (refer to FIG. 3). In addition, in order to assure control performance relative to such a variation plant, the first parameter perturbation term δF constituting one of the diagonal elements of the structured perturbation Δ is set between the first to third control outputs z1 to z3 and the third external inputs w1 to w3. The resonance suppression control circuit of Example 1 is derived based on the μ design method using the generalized plant P1 in which structured perturbation Δ is stipulated in the above way.

Example 2

Figure 6:
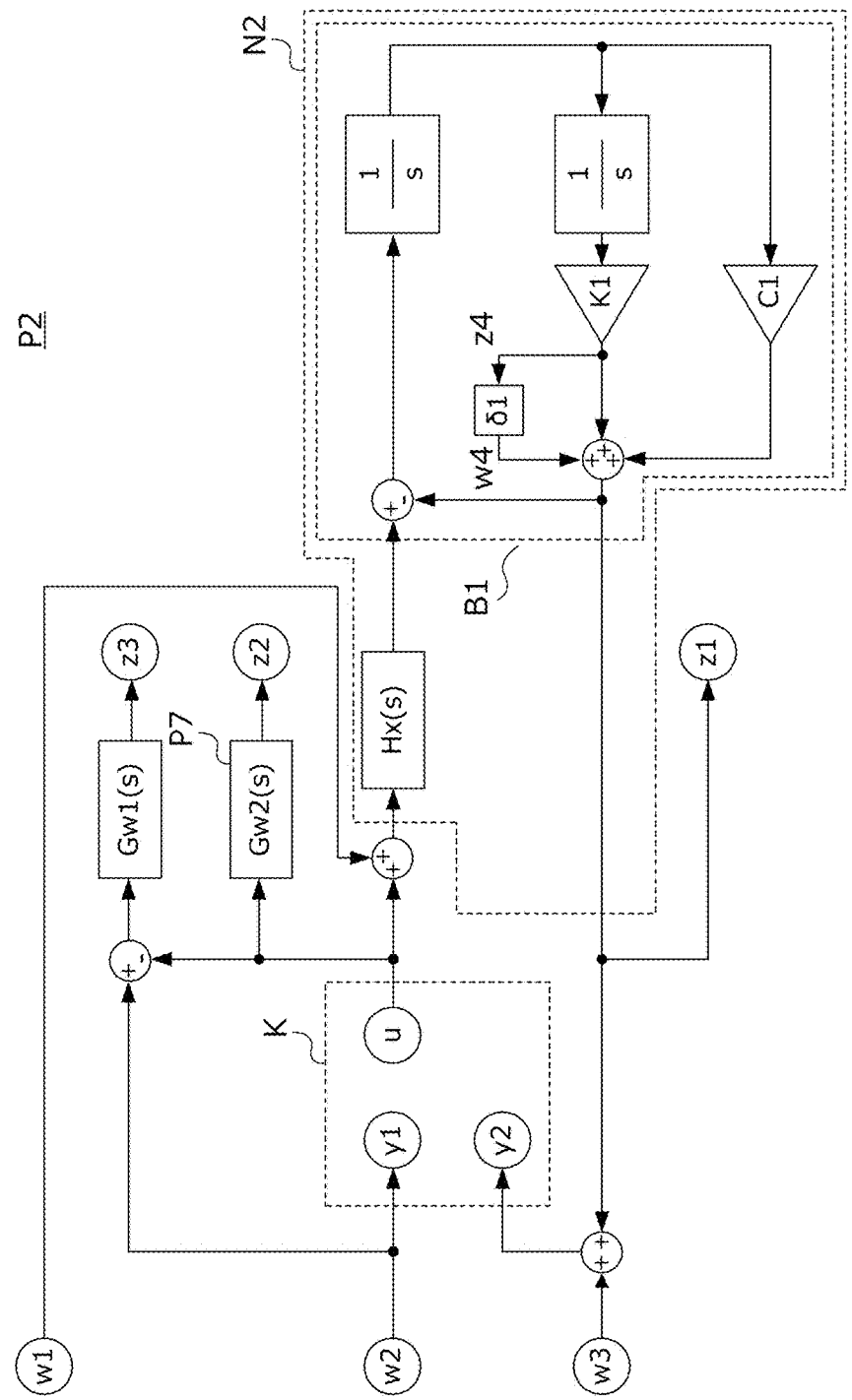
FIG. 6 is a view showing a specific configuration of a generalized plant used in the design of the resonance suppression control circuit of Example 2.

FIG. 6 is a view showing a specific configuration of a generalized plant P2 used in the design of the resonance suppression control circuit of Example 2.

The generalized plant P2 according to Example 2 has a configuration of the nominal model N2 which differs from the generalized plant P1 according to Example 1. More specifically, it differs in the point of the order of multiplying the high-order vibration mode transfer function Hx(s) and the low-order vibration mode transfer function $M1(s)$ being opposite to the nominal model N1 according to Example 1, and the other configurations are the same. The resonance suppression control circuit of Example 2 is derived based on the μ design method using the generalized plant P2 in which structured perturbation Δ is stipulated in the above way.

Figure 7:
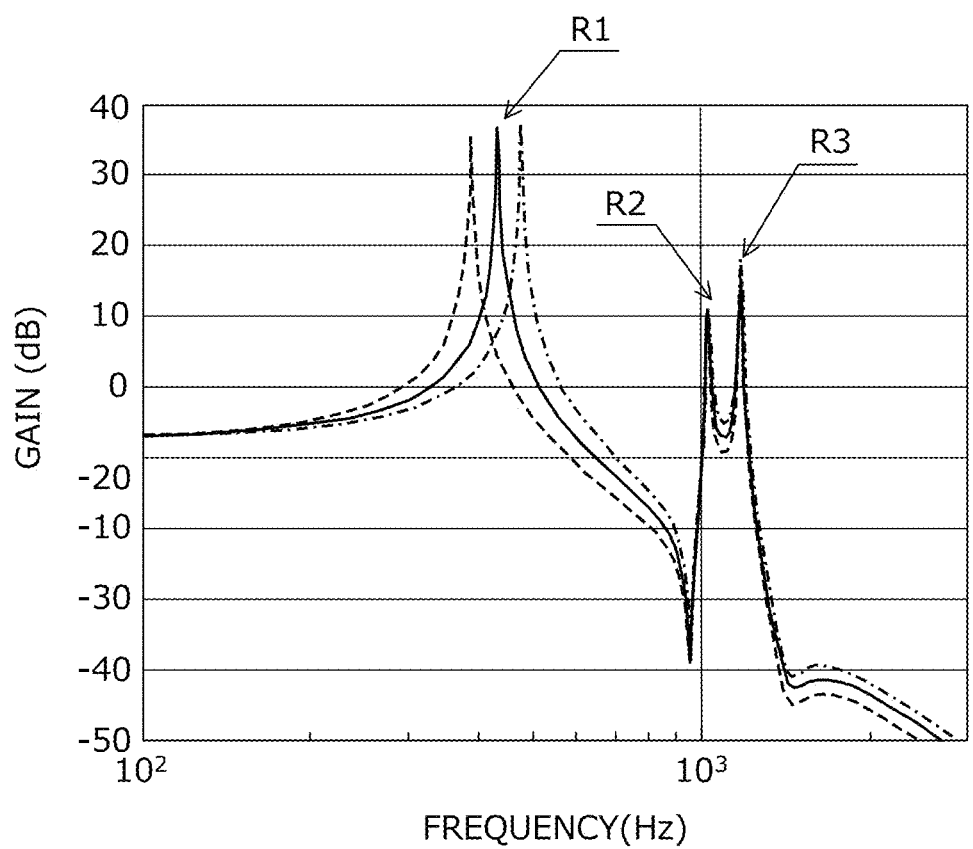
FIG. 7 is a Bode diagram from a base torque command signal until a shaft torque detection signal in a nominal model according to Examples 1 and 2.

FIG. 7 is a Bode diagram from a base torque command signal until a shaft torque detection signal in a nominal model according to Examples 1 and 2. It should be noted that, in the nominal model in which the first parameter perturbation term δ1 is set as shown in FIGS. 5 and 6, FIG. 7 shows the model setting the value of the first parameter perturbation term δ1 (hereinafter referred to simply as "perturbation amount") as 0 by a solid line, shows a model setting the perturbation amount as +0.2 and increasing the spring constant K1 by 20% by a dotted line, and shows a model setting the perturbation amount as −0.2 and decreasing the spring constant K1 by −20% by a dashed line. It should be noted that, in FIG. 7, the function form of the high-order vibration mode transfer function Hx(s) was set as $H1(s)$ defined by formula (4).

As shown in FIG. 7, the vibration modes R1, R2 and R3 exist in order from the low-order side, in the characteristic from the base torque command signal until the shaft torque detection signal of the nominal model according to Examples 1 and 2. In addition, as shown in FIG. 7, when varying the perturbation amount, although the resonance frequency of the low-order vibration mode R1 which is the lowest order among the three vibration modes R1 to R3 varies, the resonance frequencies of the high-order vibration modes R2 and R3 of higher order than the low-order resonance mode R1 does not vary. More specifically, when varying the perturbation amount to the positive side, the resonance frequency of low-order vibration mode R1 changes to the low frequency side, and when varying the perturbation amount to the negative side, the resonance frequency of the low-order vibration mode R1 changes to the high frequency side. Therefore, according to the generalized plant of Examples 1 and 2, as shown in FIGS. 5 and 6, by setting the first parameter perturbation term δ1 so as to apply multiplicative error to the spring constant K1 included in the low-order vibration mode transfer function $M1(s)$, it is possible to construct a resonance suppress control circuit in which robust stability is ensured relative to fluctuation in resonance frequency of the low-order vibration mode R1 serving as the suppression target.

Figure 8:
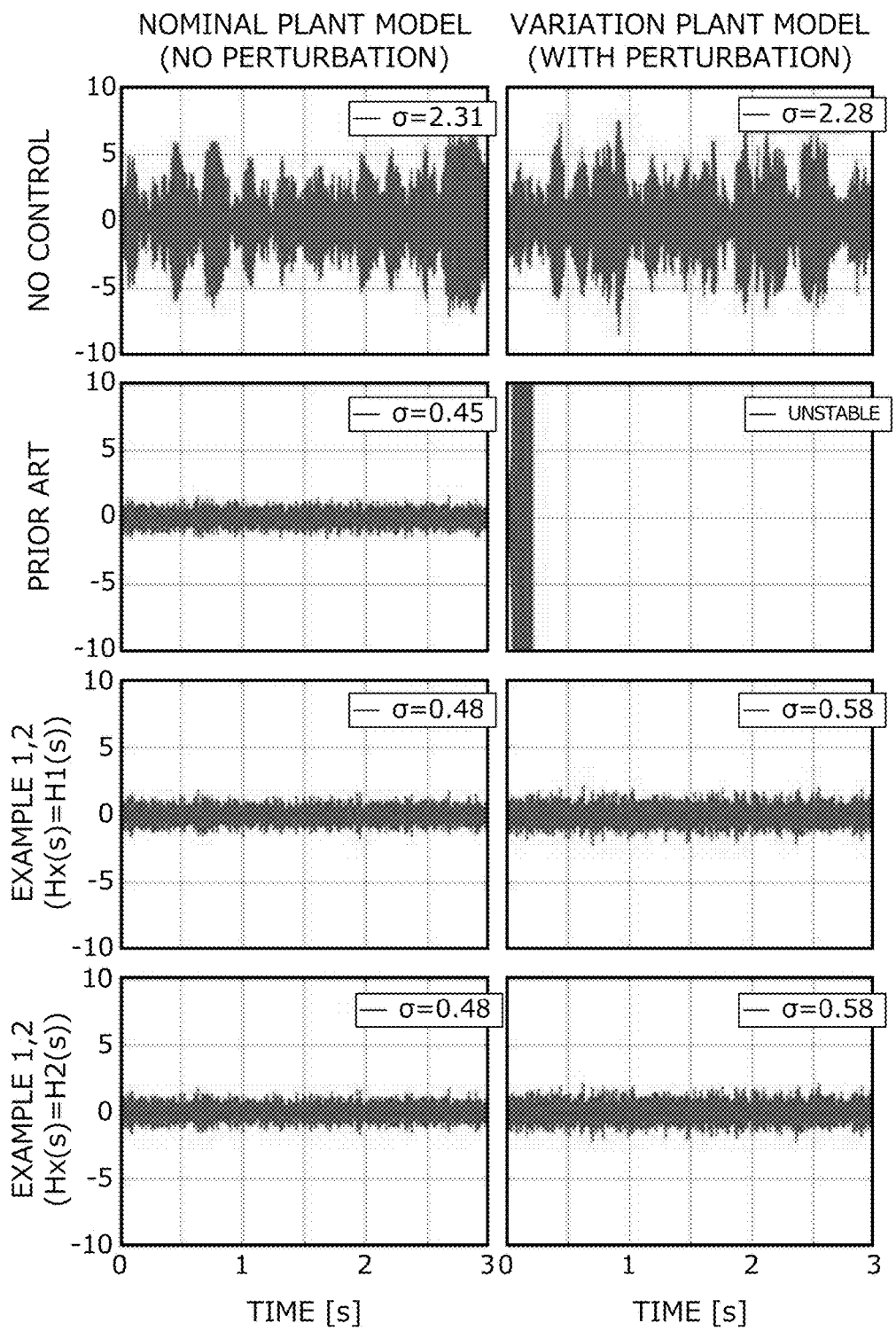
FIG. 8 provides graphs comparing the performance of the resonance suppression control circuits of Examples 1 and 2.

FIG. 8 provides graphs comparing the performance of the resonance suppression control circuits of Examples 1 and 2. FIG. 8 shows various responses in the case of inputting a statistical distribution noise having standard deviation of 1 to the resonance suppression control circuit as a base torque command signal. The column on the left side in FIG. 8 shows the various responses in the case of establishing the nominal plant model obtained with the perturbation amount as 0 in the nominal model N1 of FIG. 5 as the control target. In addition, the column on the right side in FIG. 8 shows various responses in the case of establishing, as the control target, a model obtained by assuming a case of fluctuation occurring in the resonance frequency of the low-order vibration mode from the aforementioned nominal plant model, i.e. variation plant model obtained with the perturbation amount as +0.6 in the nominal model N1 of FIG. 5.

In addition, the topmost in FIG. 8 shows a change in the shaft torque detection signal in an uncontrolled state, i.e. in the case of inputting the aforementioned such random base torque command signal as is into the above-mentioned nominal plant model or variation plant model. The second row from the top in FIG. 8 shows the change in the shaft torque detection signal in the case of connecting the resonance suppression control circuit described in PCT International Publication No. WO2015/136626 by the applicants of the present application (hereinafter this is referred to as "prior art resonance suppression control circuit") to the above-mentioned nominal plant model or variation plant model. The third and fourth rows from the top in FIG. 8 shows the change in the shaft torque detection signal in a case of connecting the resonance suppression control circuit derived using the generalized plant of Example 1 or Example 2 to the above-mentioned nominal plant model or variation plant model. In other words, it provides graphs showing the effect of the resonance suppression control circuit of Example 1 or Example 2. It should be noted that the third row from the top in FIG. 8 shows the results of the resonance suppression control circuit obtained in the case of setting the function form of the high-order vibration mode transfer function Hx(s) as $H1(s)$; and the fourth row from the top in FIG. 8 shows the results of the resonance suppression control circuit obtained in the case of setting the function form of the high-order vibration mode transfer function Hx(s) as $H2(s)$.

As shown in the topmost of FIG. 8, when inputting a random base torque command signal as is into the model without passing through the resonance suppression control circuit, the shaft torque detection signal also fluctuates greatly. In contrast, as shown on the left side of the second row from the top in FIG. 8, when using the prior art resonance suppression control circuit, sufficient resonance suppression function is exhibited in the nominal plant model having no perturbation (i.e. no fluctuation in resonance frequency of the low-order vibration mode), and the oscillation of the shaft torque detection signal is suppressed. However, as shown on the right side of the second row from the top in FIG. 8, in the case of perturbation arising and fluctuation occurring from the nominal plant model at the resonance frequency of the low-order vibration mode with the prior art resonance suppression control circuit, the resonance suppression function thereof is not exhibited, and control becomes unstable.

In contrast, according to the resonance suppress control circuit of Example 1 or Example 2, in both the nominal plant model (left side of FIG. 8) and variation plant model (right side of FIG. 8), the standard deviation amount in the shaft torque detection signal decreases from the uncontrolled state, and thus, exhibits sufficient resonance suppression function. It should be noted that, even if selecting either of $H1(s)$ and $H2(s)$ as the function form of the high-order vibration mode transfer function, the standard deviation amount of the shaft torque detection signals will be nearly equal, and thus considered to exhibit nearly equal resonance suppression function.

Example 3

Figure 9:
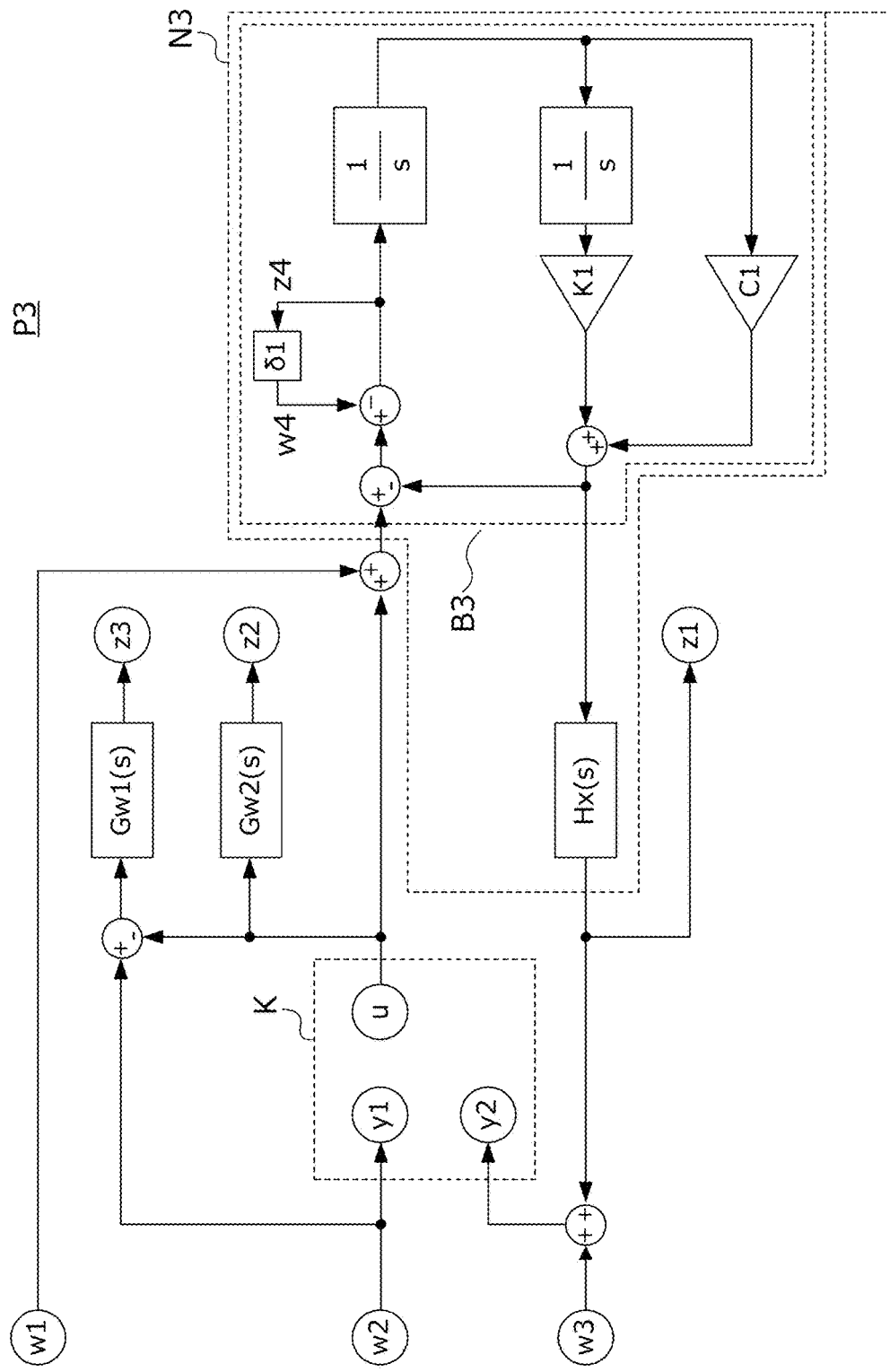
FIG. 9 is a view showing a specific configuration of a generalized plant used in the design of the resonance suppression control circuit of Example 3.

FIG. 9 is a view showing a specific configuration of a generalized plant P3 used in the design of the resonance suppression control circuit of Example 3

As shown in FIG. 9, the generalized plant P3 according to Example 3 has a configuration of block B3 representing the low-order vibration mode transfer function M1(s) of the nominal model N3 which differs from the generalized plant P1 according to Example 1. More specifically, in the nominal model N3, the position at which setting the fourth external input w4, fourth control output z4 and first parameter perturbation term δ1 relative to the low-order vibration model transfer function M1(s) differs from the nominal model N1 according to Example 1, and other configurations are the same.

The fourth external input w4 and fourth control output z4 are set so as to apply multiplicative error on the unit moment of inertia J (=1) having a correlation with the magnitude of resonance frequency of the low-order vibration mode, among the plurality of parameters included in the low-order vibration mode transfer function M1(s) having a low-order vibration mode as shown in FIG. 9. In addition, in order to configure so that a resonance suppression control circuit is obtained that is robustly stable relative to multiplicative error in the unit moment of inertia J which affects the fluctuation directly on the resonance frequency of the low-order vibration mode, the first parameter perturbation term δ1 constituting one of the diagonal elements of the structured perturbation Δ is set between this fourth control output z4 and fourth external input w4 (refer to FIG. 3). The resonance suppression control circuit of Example 3 is derived based on the μ design method using the generalized plant P3 in which structured perturbation Δ is stipulated in the above way.

Example 4

Figure 10:
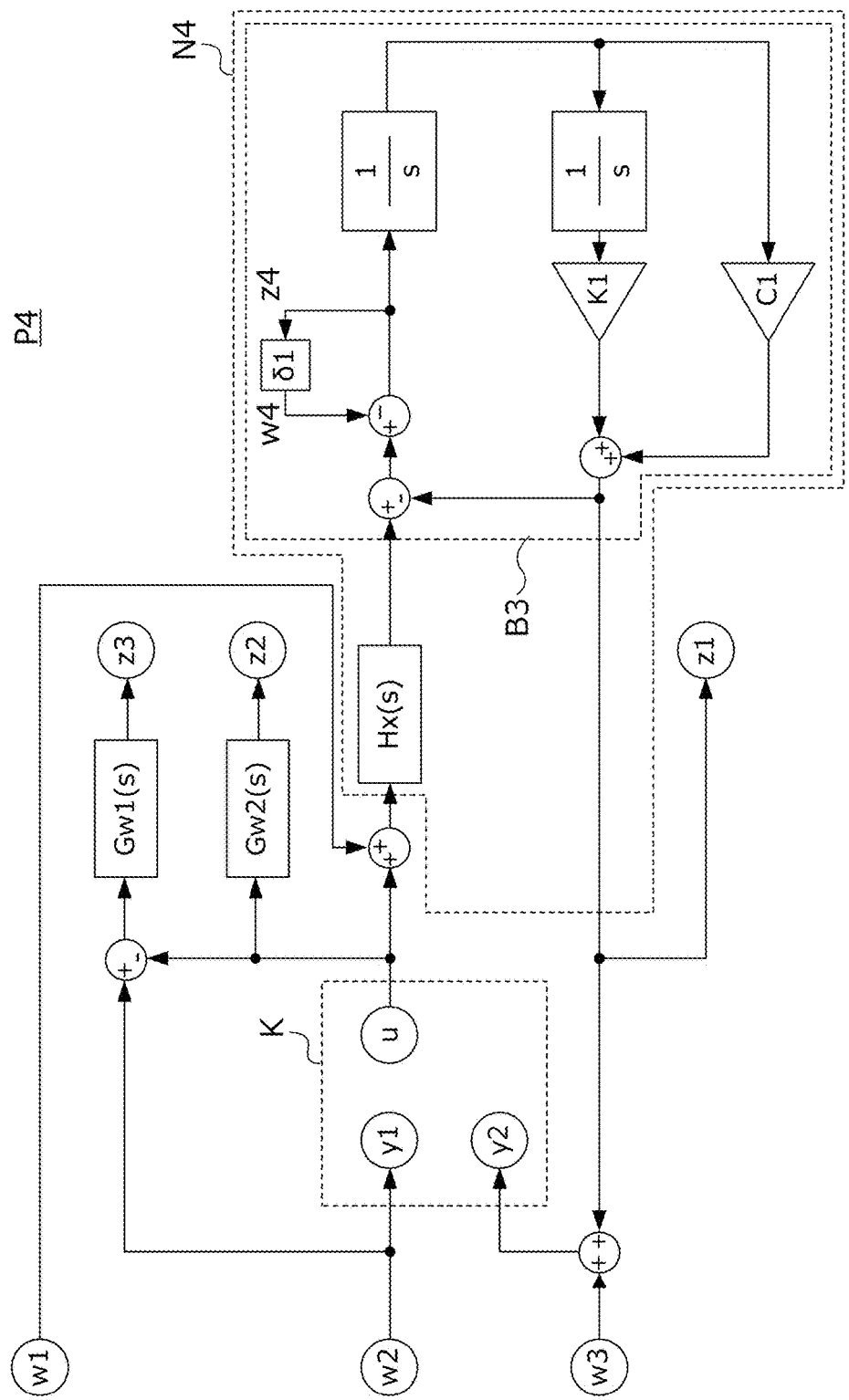
FIG. 10 is a view showing a specific configuration of a generalized plant used in the design of the resonance suppression control circuit of Example 4.

FIG. 10 is a view showing a specific configuration of a generalized plant P4 used in the design of the resonance suppression control circuit of Example 4.

The generalized plant P4 according to Example 4 has a configuration of the nominal model N which differs from the generalized plant P3 according to Example 3. More specifically, it differs in the point of the order of multiplying the high-order vibration mode transfer function Hx(s) and the low-order vibration mode transfer function M1(s) being opposite the nominal model N3 according to Example 3, and the other configurations are the same. The resonance suppress control circuit of Example 4 is derived based on the μ design method using the generalized plant P4 in which structured perturbation Δ is stipulated in the above way.

Figure 11:
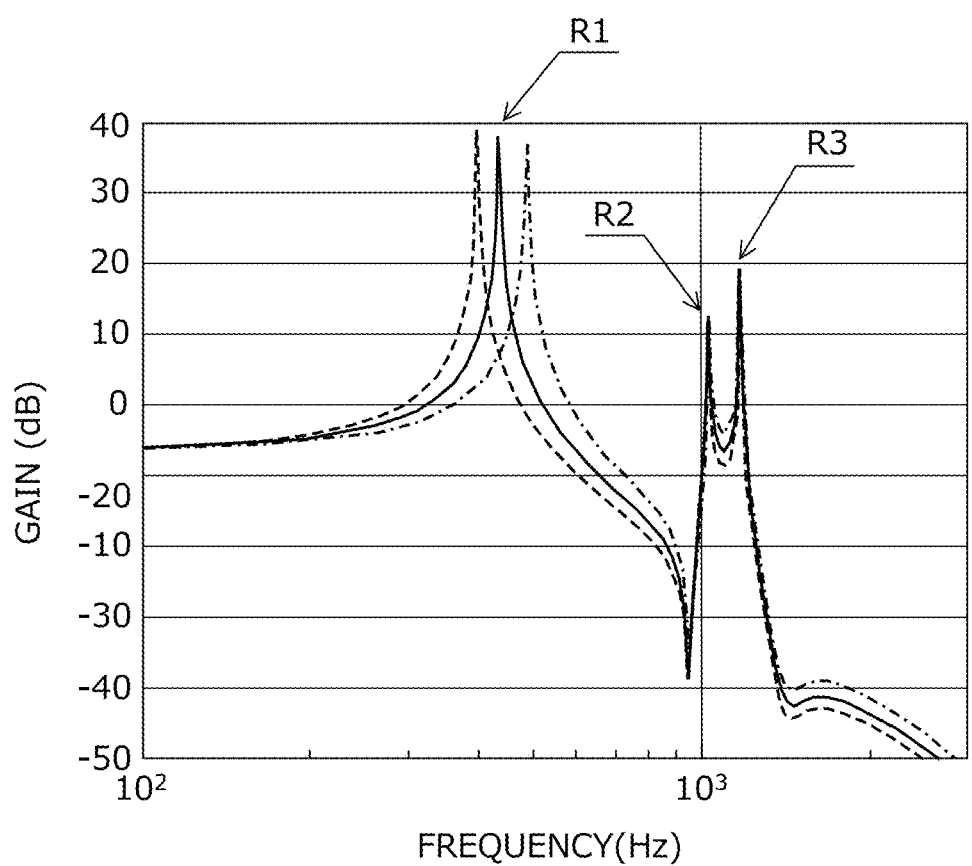
FIG. 11 is a Bode diagram from the base torque command signal until a shaft torque detection signal of the nominal model according to Examples 3 and 4.

FIG. 11 is a Bode diagram from the base torque command signal until a shaft torque detection signal of the nominal model according to Examples 3 and 4. It should be noted that, in the nominal model in which the first parameter perturbation term δ1 is set as shown in FIGS. 9 and 10, FIG. 11 shows the model setting the value of the perturbation amount as 0 by a solid line, shows a model setting the perturbation amount as +0.2 and increasing the unit moment of inertial J by 20% by a dotted line, and shows a model setting the perturbation amount as −0.2 and decreasing the unit moment of inertia J by −20% by a dashed line. It should be noted that, in FIG. 11, the function form of the high-order vibration mode transfer function Hx(s) was set as H1(s) defined by formula (4).

As shown in FIG. 11, when increasing and decreasing the perturbation, although the resonance frequency of the low-order vibration mode R1 which is the lowest order among the three vibration modes R1 to R3 changes, the resonance frequencies of the high-order vibration modes R2 and R2 which are higher order than the low-order vibration mode R1 do not change. More specifically, when causing the perturbation amount to change to the positive side, the resonance frequency of the low-order vibration mode R1 changes to the low frequency side, and when causing the perturbation amount to change to the negative side, the resonance frequency of the low-order vibration mode R1 changes to the high frequency side. Therefore, according to the generalized plants of Examples 3 and 4, as shown in FIGS. 9 and 10, by setting the first parameter perturbation term δ1 so as to apply multiplicative error to the unit moment of inertia J included in the low-order vibration mode transfer function M1, it is possible to construct a resonance suppression control circuit in which robust stability is ensured relative to fluctuation in resonance frequency of the low-order vibration mode R1 serving as the suppression target.

Figure 12:
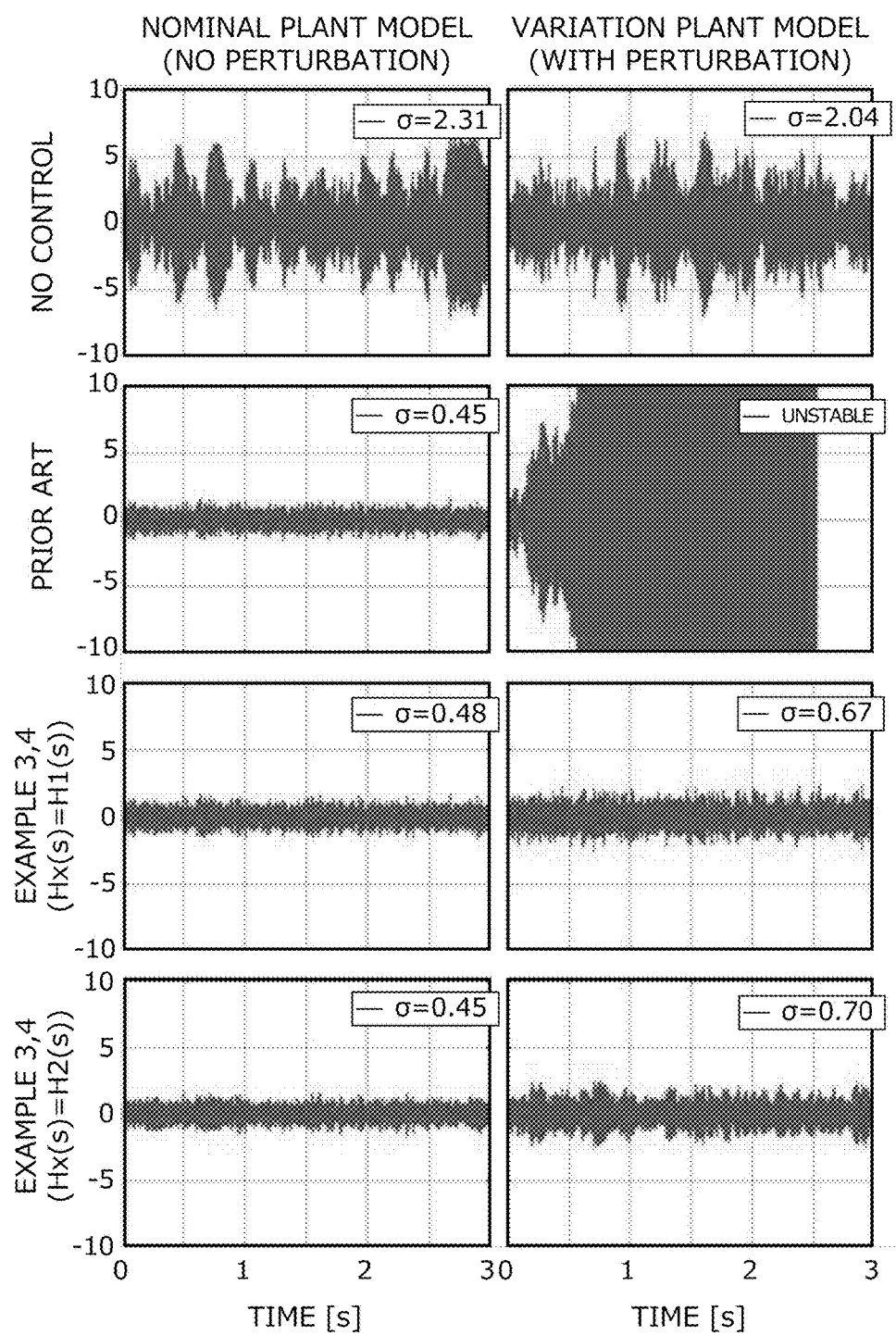
FIG. 12 provides graphs comparing the performance of the resonance suppression control circuits of Examples 3 and 4.

FIG. 12 provides graphs comparing the performance of the resonance suppression control circuits of Examples 3 and 4. FIG. 12 shows various responses in the case of inputting a random base torque command signal similarly to FIG. 8 into the resonance suppression control circuit. The column on the left side in FIG. 12 shows various responses in the case of establishing as the control target the nominal plant model obtained with the perturbation amount as 0 in the nominal model N3 of FIG. 3; and the column on the right side in FIG. 12 shows various responses in the case of establishing as the control target the variation plant model obtained with the perturbation amount as −0.35 in the nominal model N3 of FIG. 9. It should be noted that the topmost in FIG. 12 shows the change in shaft torque detection signal in an uncontrolled state, the second row from the top in FIG. 12 shows the results of the prior art resonance suppression control circuit, and the third and fourth rows from the top in FIG. 12 show the effects of the resonance suppression control circuit of Example 3 or Example 4 in the case of setting the function forms of Hx(s) as H1(s) and H2(s), respectively.

As shown in FIG. 12, the prior art resonance suppression control circuit exhibits sufficient resonance suppression function relative to the nominal plane model without perturbation; however, it does not exhibit sufficient resonance suppression function relative to the variation plant model in which fluctuation occurred from the nominal plant model at the resonance frequency of the low-order vibration mode, and control becomes unstable. In contrast, according to the resonance suppression control circuit of Example 3 or Example 4, in both of the nominal plant model (left side of FIG. 12) and variation plant model (right side of FIG. 12), the standard deviation amount of the shaft torque detection signal decreases from the uncontrolled state, and thus exhibits sufficient resonance suppression function. It should be noted that, even if selecting either of H1(s) and H2(s) as the function form of the high-order vibration mode transfer function, the standard deviation amount of the shaft torque detection signals are nearly equal, and thus considered to exhibit nearly equal resonance suppression function.

Example 5

Figure 13:
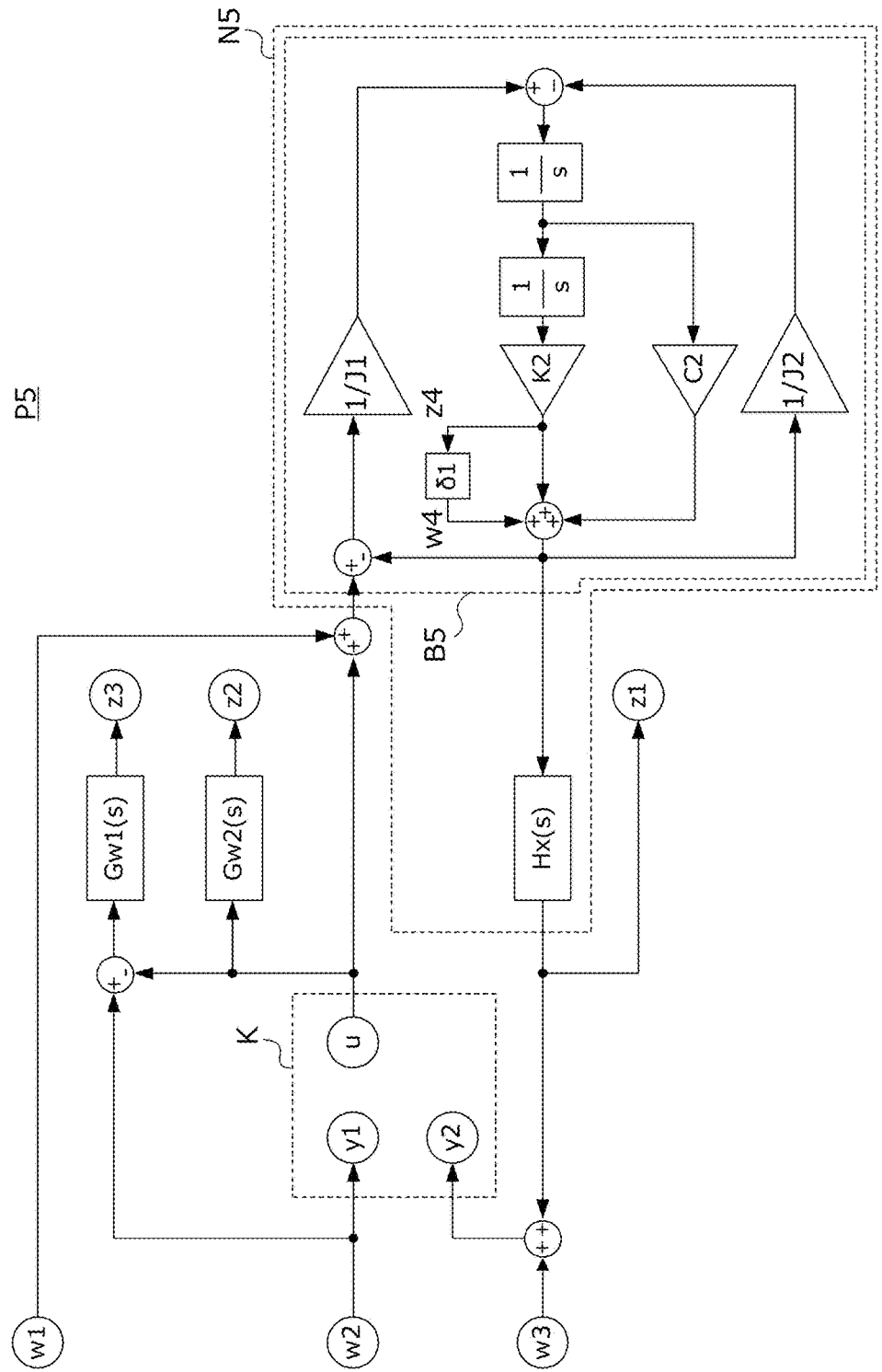
FIG. 13 is a view showing a specific configuration of a generalized plant used in the design of the resonance suppression control circuit of Example 5.

FIG. 13 is a view showing a specific configuration of a generalized plant P5 used in the design of the resonance suppression control circuit of Example 5.

In the generalized plant P5 according to Example 5, the configuration of the nominal model N5 differs from the generalized plant P1 according to Example 1. The transfer function G(s) of the nominal model N5 is represented by the product (G(s)=Hx(s)×M2(s)) of the low-order vibration mode transfer function M2(s) having the low-order vibration mode R1 serving as the suppression target and the high-order vibration mode transfer function Hx(s) having vibration modes R2 and R3 which are higher order than this low-order vibration mode R1.

In the two-degrees of freedom vibration system configured by connecting a first inertia field having a predetermined first moment of inertia J1 and a second inertia field having a predetermined second moment of inertia J2 by a shaft element having a predetermined spring constant K2 and damping constant C2, a transfer function from the torque acting on the first inertia field until the torque generated at the shaft element having a pole corresponding to the low-order vibration mode R1 of the suppression target is used as the low-order vibration mode transfer function M2(s). More specifically, in the case of defining the pole of the transfer function M2(s) as "$p_R$", and defining the complex conjugate thereof as "$p_R^*$", the spring constant K2, damping constant C2 and low-order vibration mode transfer function M2(s) are expressed as in the following formula (5). In addition, this low-order vibration mode transfer function M2(s) is represented by block B5 in the block diagram of FIG. 13. It should be noted that as the specific values of the first moment of inertia J1 and second moment of inertia J2, the value of the moment of inertia of the drive motor and test piece identified by a known identification method, for example, identification method described in Japanese Patent No. 4788543 by the applications of the present application, can be used.

$$K2 = \frac{p_R \cdot p_R^*}{\frac{1}{J1} + \frac{1}{J2}}, \quad C2 = -\frac{p_R + p_R^*}{\frac{1}{J1} + \frac{1}{J2}}, \quad M2(s) = \frac{1}{J1} \cdot \frac{C2 \cdot s + K2}{(s - p_R) \cdot (s - p_R^*)} \quad (5)$$

The high-order vibration mode transfer function Hx(s) is identified by specifying the function form thereof by H1(s) or H2(s) shown in formula (4) similarly to Example 1, and using a known system identification method similarly to Example 1, together with the value of the complex number $p_R$ representing the pole of the transfer function M2(s).

In addition, the fourth external input w4 and fourth control output z4 are set so as to apply multiplicative error on this spring constant K2, at the output terminal of the spring constant K2 having a correlation with the magnitude of the resonance frequency of the low-order vibration mode, among the plurality of parameters included in the low-order vibration mode transfer function M2(s) having the low-order vibration mode as shown in FIG. 13. In addition, in order to configure so that a resonance suppression control circuit is obtained which is robustly stable relative to multiplicative error of the spring constant K2 affecting the fluctuation directly on the resonance frequency of the low-order frequency mode, the first parameter perturbation term δ1 constituting one of the diagonal elements of the structured perturbation Δ is set between this fourth control output z4 and fourth external input w4. The resonance suppression control circuit of Example 5 is derived based on the μ design method using the generalized plant P5 in which the structured perturbation Δ is stipulated in the above way.

Example 6

Figure 14:
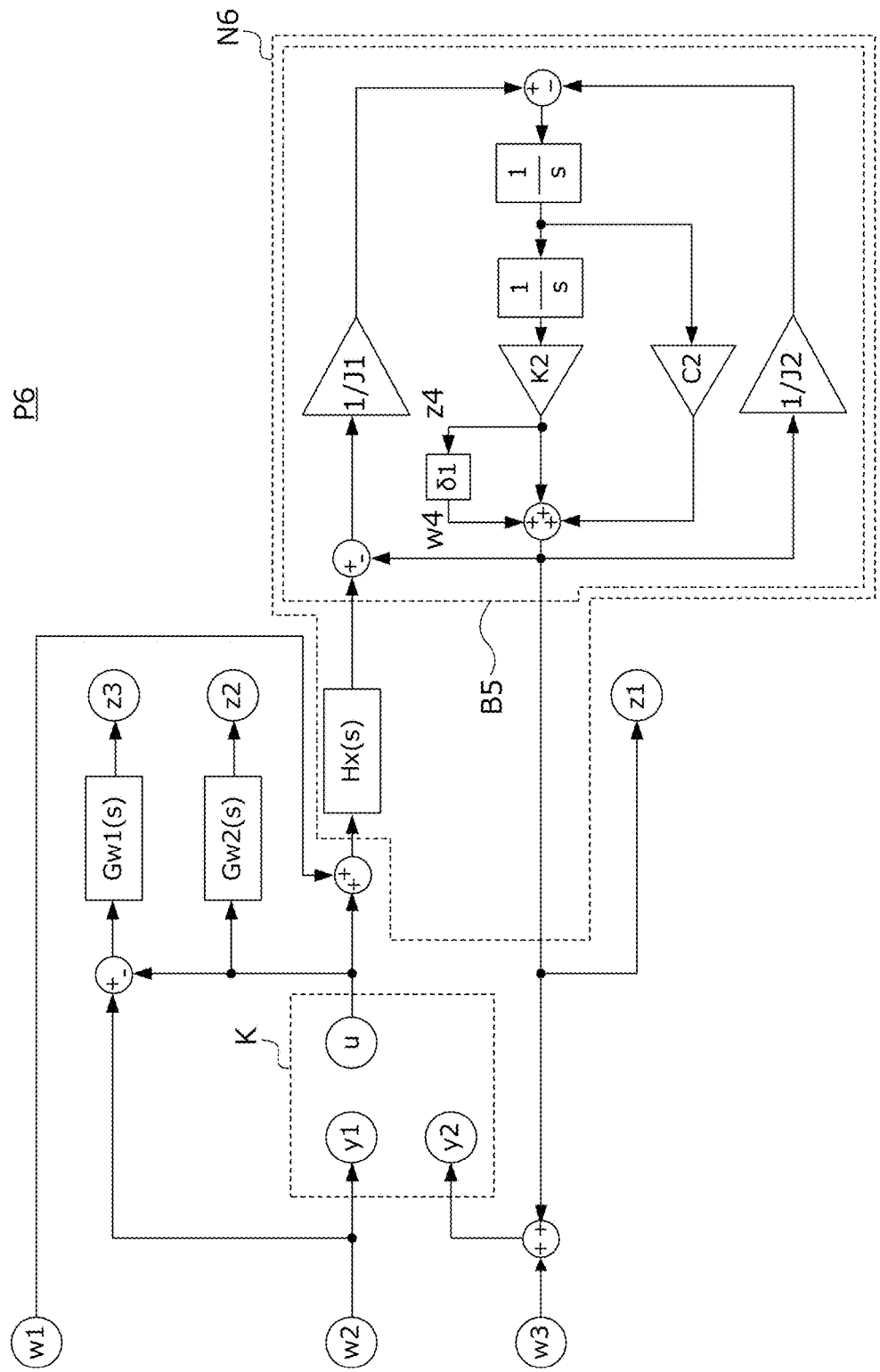
FIG. 14 is a view showing a specific configuration of a generalized plant used in the design of the resonance suppression control circuit of Example 6.

FIG. 14 is a view showing a specific configuration of a generalized plant P6 used in the design of the resonance suppression control circuit of Example 6.

The generalized plant P6 according to Example 6 has a configuration of the nominal model N6 which differs from the generalized plant P5 according to Example 5. More specifically, it differs in the point of the order of multiplying the high-order vibration mode transfer function Hx(s) and low-order vibration mode transfer function M2(s) being opposite the nominal model N5 according to Example 5, and the other configurations are the same. The resonance suppression control circuit of Example 6 is derived based on the μ design method using the generalized plant P6 in which the structured perturbation Δ is stipulated in the above way.

Figure 15:
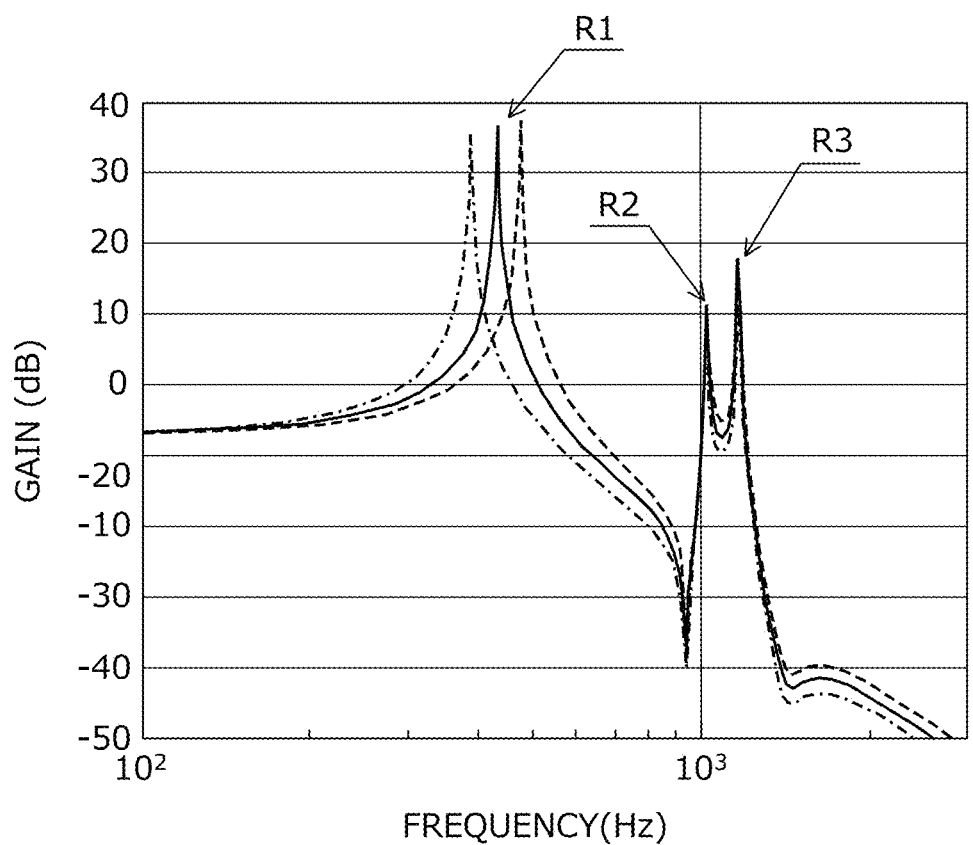
FIG. 15 is a Bode diagram from a base torque command signal until a shaft torque detection signal in a nominal model according to Examples 5 and 6.

FIG. 15 is a Bode diagram from a base torque command signal until a shaft torque detection signal in a nominal model according to Examples 5 and 6. It should be noted that, in the nominal model in which the first parameter perturbation term δ1 is set as shown in FIGS. 13 and 14, FIG. 15 shows the model setting the value of the perturbation amount as 0 by a solid line, shows a model setting the perturbation amount as +0.2 and increasing the spring constant K2 by 20% by a dotted line, and shows a model setting the perturbation amount as −0.2 and decreasing the spring constant K2 by −20% by a dashed line. It should be noted that, in FIG. 15, the function form of the high-order vibration mode transfer function Hx(s) was set as H1(s) defined by formula (4).

As shown in FIG. 15, when increasing and decreasing the perturbation, although the resonance frequency of the low-order vibration mode R1 which is the lowest order among the three vibration modes R1 to R3 changes, the resonance frequencies of the high-order vibration modes R2 and R2 which are higher order than the low-order vibration mode R1 do not change. More specifically, when causing the perturbation amount to change to the positive side, the resonance frequency of the low-order vibration mode R1 changes to the high frequency side, and when causing the perturbation amount to change to the negative side, the resonance frequency of the low-order vibration mode R1 changes to the low frequency side. Therefore, according to the generalized plants of Examples 5 and 6, as shown in FIGS. 13 and 14, by setting the first parameter perturbation term δ1 so as to apply multiplicative error to the spring constant K2 included in the low-order vibration mode transfer function M2, it is possible to construct a resonance suppression control circuit in which robust stability is ensured relative to fluctuation in resonance frequency of the low-order vibration mode R1 serving as the suppression target.

Figure 16:
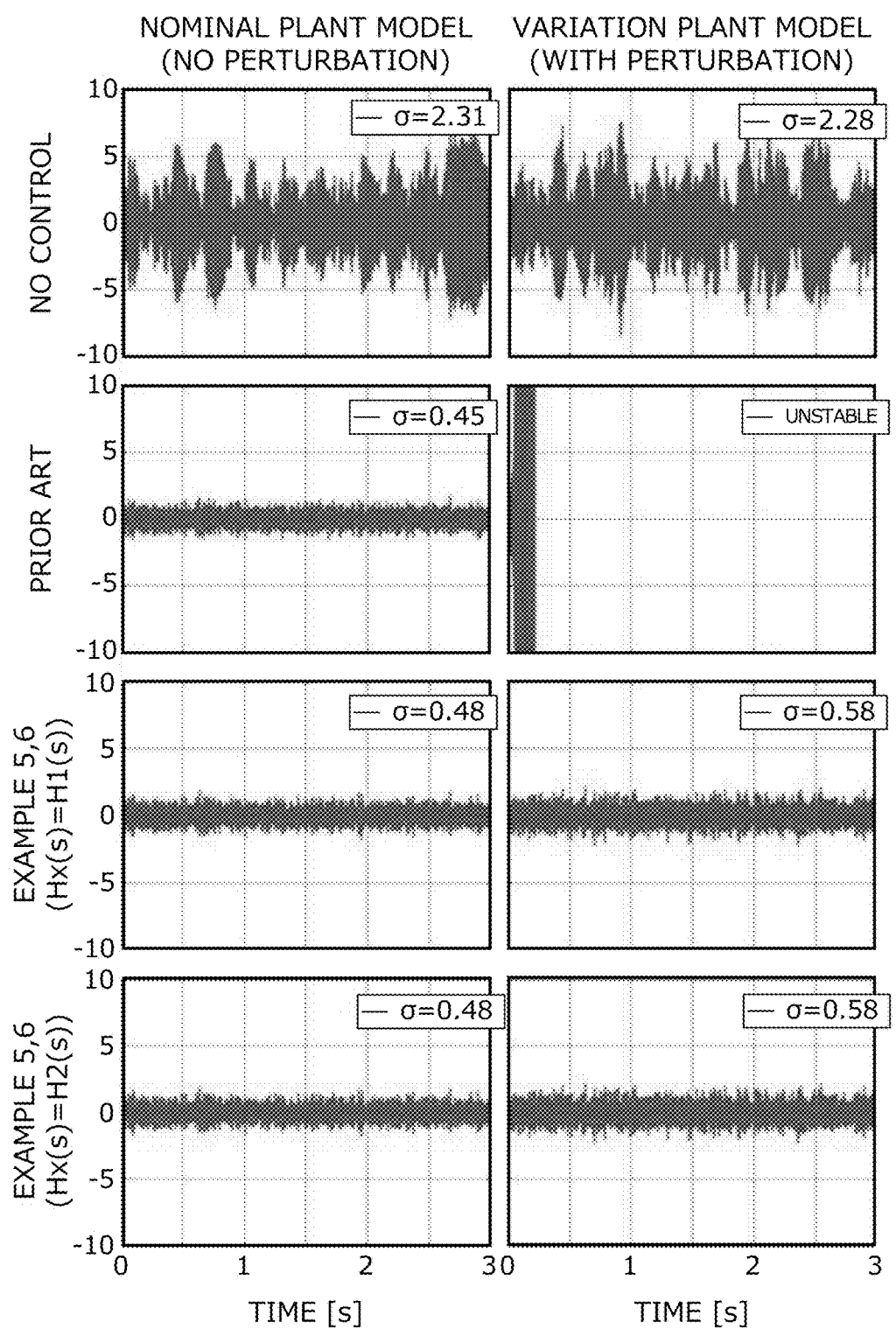
FIG. 16 provides graphs comparing the performance of the resonance suppression control circuits of Example 5 and 6.

FIG. 16 provides graphs comparing the performance of the resonance suppression control circuits of Example 5 and 6. FIG. 16 shows various responses in the case of inputting a random base torque command signal similarly to FIG. 8 into the resonance suppression control circuit. The column on the left side in FIG. 16 shows various responses in the case of establishing as the control target a nominal plant model obtained with the perturbation amount as 0 in the nominal model N5 of FIG. 13, and the column on the right side in FIG. 16 shows various responses in the case of establishing as the control target a variation plant model obtained with the perturbation amount as +0.6 in the nominal model N5 of FIG. 13. It should be noted that the topmost in FIG. 16 shows the change in shaft torque detection signal in an uncontrolled state, the second row from the top in FIG.

16 shows the results of the prior art resonance suppression control circuit, and the third and fourth rows from the top in FIG. 16 show the effects of the resonance suppression control circuit of Example 5 or Example 6 in the case of setting the function forms of Hx(s) as H1(s) and H2(s), respectively.

As shown in FIG. 16, the prior art resonance suppression control circuit exhibits sufficient resonance suppression function relative to the nominal plane model without perturbation; however, it does not exhibit sufficient resonance suppression function relative to the variation plant model in which fluctuation occurred from the nominal plant model at the resonance frequency of the low-order vibration mode, and control becomes unstable. In contrast, according to the resonance suppression control circuit of Example 5 or Example 6, in both of the nominal plant model (left side of FIG. 16) and variation plant model (right side of FIG. 16), the standard deviation amount of the shaft torque detection signal decreases from the uncontrolled state, and thus exhibits sufficient resonance suppression function. It should be noted that, even if selecting either of H1(s) and H2(s) as the function form of the high-order vibration mode transfer function, the standard deviation amount of the shaft torque detection signals are nearly equal, and thus considered to exhibit nearly equal resonance suppression function.

Example 7

Figure 17:
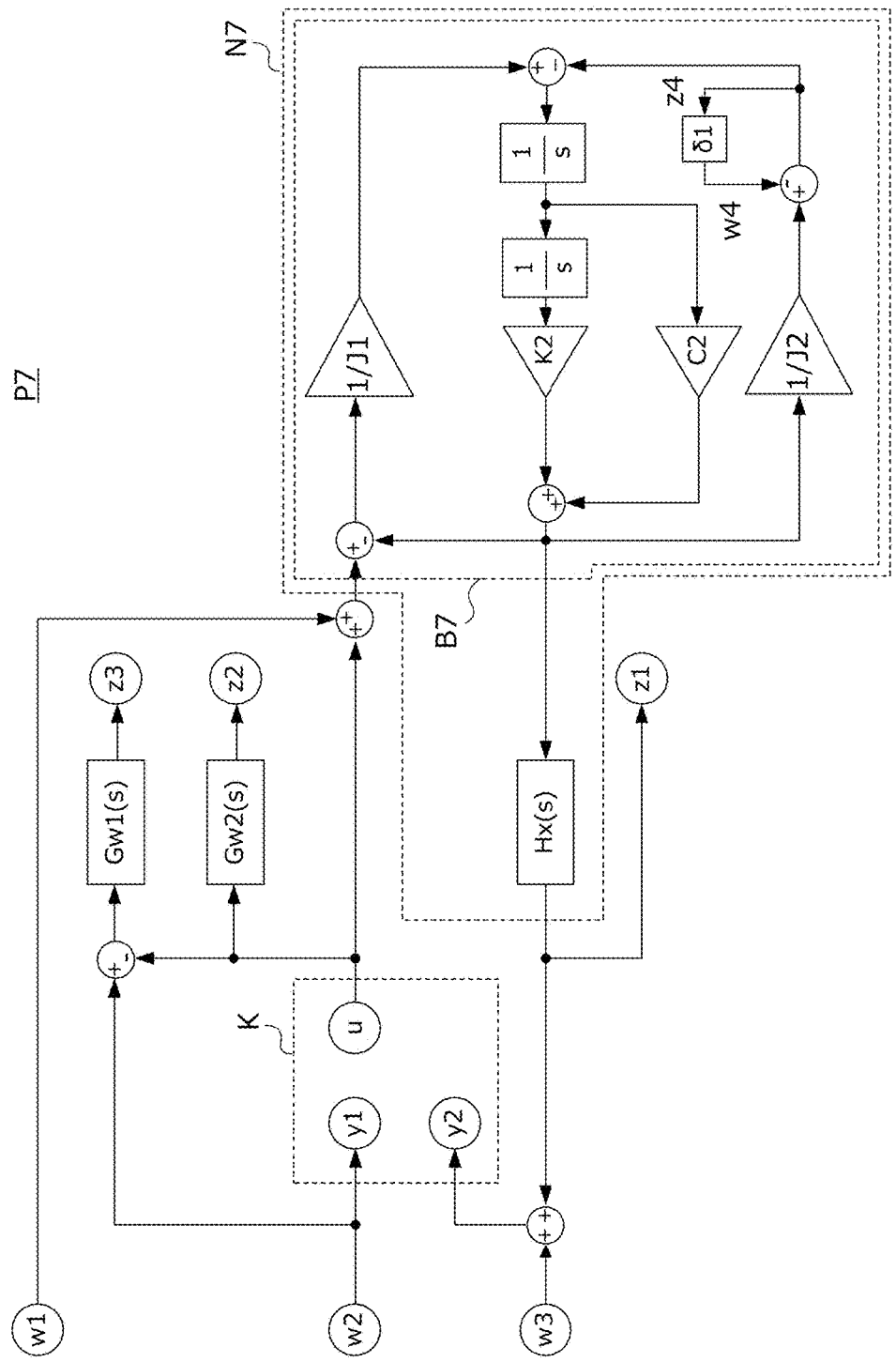
FIG. 17 is a view showing a specific configuration of a generalized plant used in the design of the resonance suppression control circuit of Example 7.

FIG. 17 is a view showing a specific configuration of a generalized plant P7 used in the design of the resonance suppression control circuit of Example 7.

As shown in FIG. 17, the generalized plant P7 according to Example 7 has a configuration of the block B7 representing the low-order vibration mode transfer function M2(s) among the nominal model N7 which differs from the generalized plant P5 according to Example 5. More specifically, in the nominal model N7, the position at which setting the fourth external input w4, fourth control output z4 and first parameter perturbation term δ1 relative to the low-order vibration mode transfer function M2(s) differs from the nominal model N5 according to Example 5, and other configurations are the same.

The fourth external input w4 and fourth control output z4 are set so as to apply multiplicative error on the second moment of inertia J2 having a correlation with the magnitude of resonance frequency of the low-order resonance mode, among the plurality of parameters included in the low-order vibration mode transfer function M2(s) having a low-order vibration mode as shown in FIG. 17. In addition, in order to configure so that a resonance suppression control circuit is obtained which is robustly stable relative to multiplicative error of such a second moment of inertia J2, the first parameter perturbation term δ1 constituting one of the diagonal elements of the structured perturbation Δ is set between this first control output z4 and fourth external input w4. The resonance suppression control circuit of Example 7 is derived based on the μ design method using the generalized plant P7 in which structured perturbation Δ is stipulated in the above way.

Example 8

Figure 18:
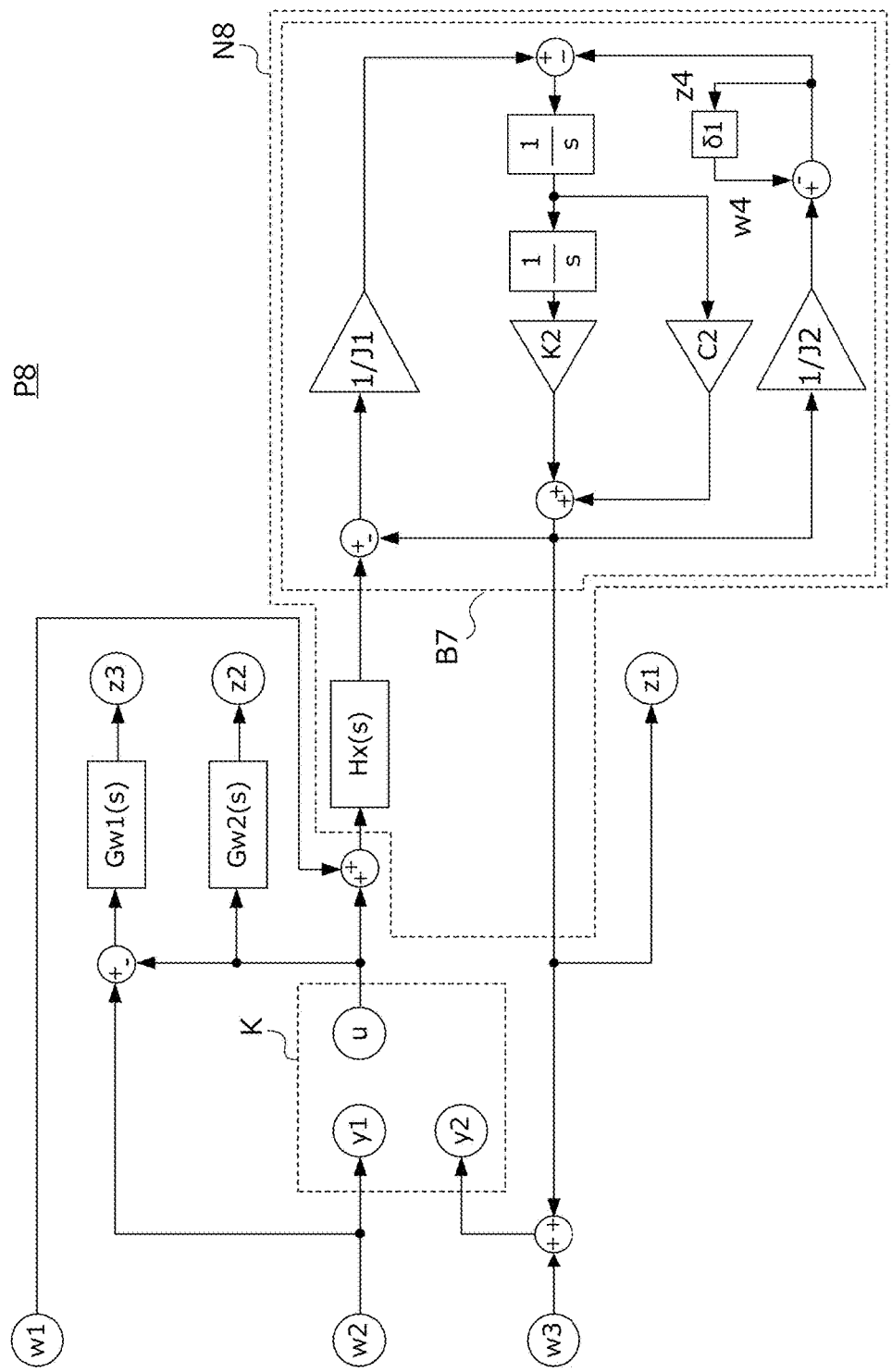
FIG. 18 is a view showing a specific configuration of a generalized plant used in the design of the resonance suppression control circuit of Example 8.

FIG. 18 is a view showing a specific configuration of a generalized plant P8 used in the design of the resonance suppression control circuit of Example 8.

The generalized plant P8 according to Example 8 has a configuration of the nominal model N8 which differs from the generalized plant P7 according to Example 7. More specifically, it differs in the point of the order of multiplying the high-order vibration mode transfer function Hx(s) and the low-order vibration mode transfer function M2(s) being opposite the nominal model N7 according to Example 7, and the other configurations are the same. The resonance suppression control circuit of Example 8 is derived based on the μ design method using the generalized plant P8 in which structured perturbation Δ is stipulated in the above way.

Figure 19:
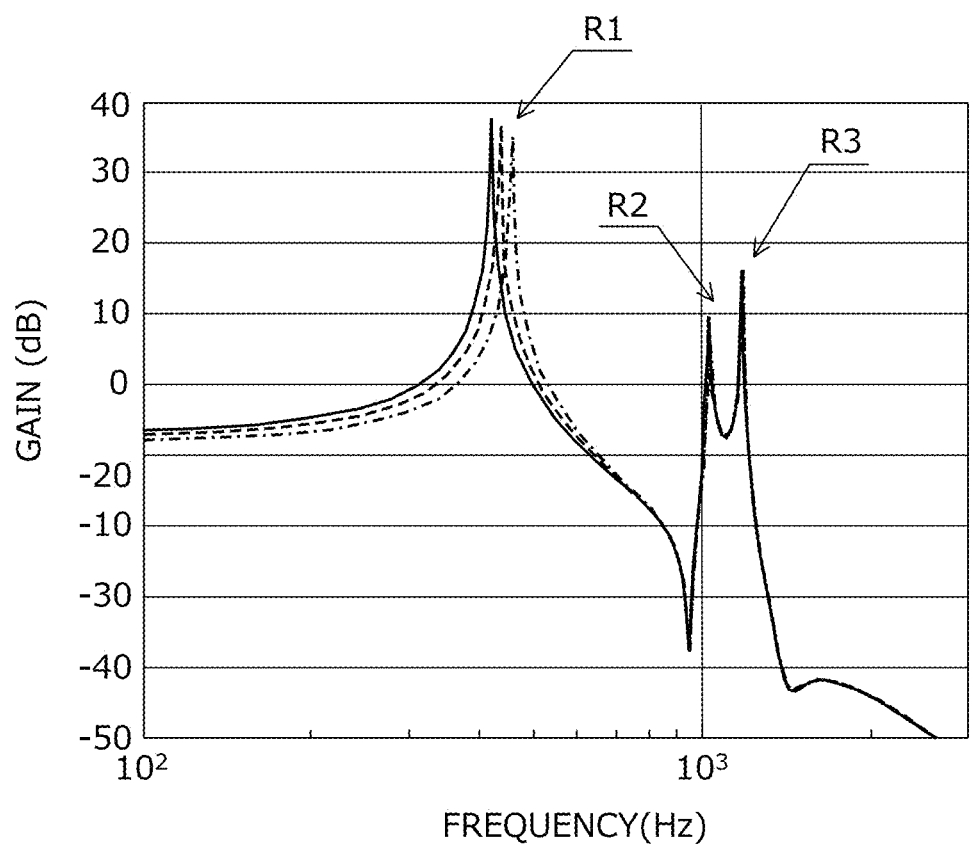
FIG. 19 is a Bode diagram from a base torque command signal until a shaft torque detection signal in a nominal model according to Examples 7 and 8.

FIG. 19 is a Bode diagram from a base torque command signal until a shaft torque detection signal in a nominal model according to Examples 7 and 8. It should be noted that, in the nominal model in which the first parameter perturbation term δ1 is set as shown in FIGS. 17 and 18, FIG. 19 shows the model setting the value of the perturbation amount as 0 by a solid line, shows a model setting the perturbation amount as +0.2 and increasing the second moment of inertial J2 by 20% by a dotted line, and shows a model setting the perturbation amount as −0.2 and decreasing the second moment of inertia J2 by −20% by a dashed line. It should be noted that, in FIG. 19, the function form of the high-order vibration mode transfer function Hx(s) was set as H1(s) defined by formula (4).

As shown in FIG. 19, when causing the perturbation amount to change to the positive side, the resonance frequency of the low-order vibration mode R1 changes to the low frequency side, and when causing the perturbation amount to change to the negative side, the resonance frequency of the low-order vibration mode R1 changes to the high frequency side. Therefore, according to the generalized plants of Examples 7 and 8, as shown in FIGS. 17 and 18, by setting the first parameter perturbation term δ1 so as to apply multiplicative error to the second moment of inertia J2 included in the low-order vibration mode transfer function M2, it is possible to construct a resonance suppression control circuit in which robust stability is ensured relative to fluctuation in resonance frequency of the low-order vibration mode R1 serving as the suppression target.

Figure 20:
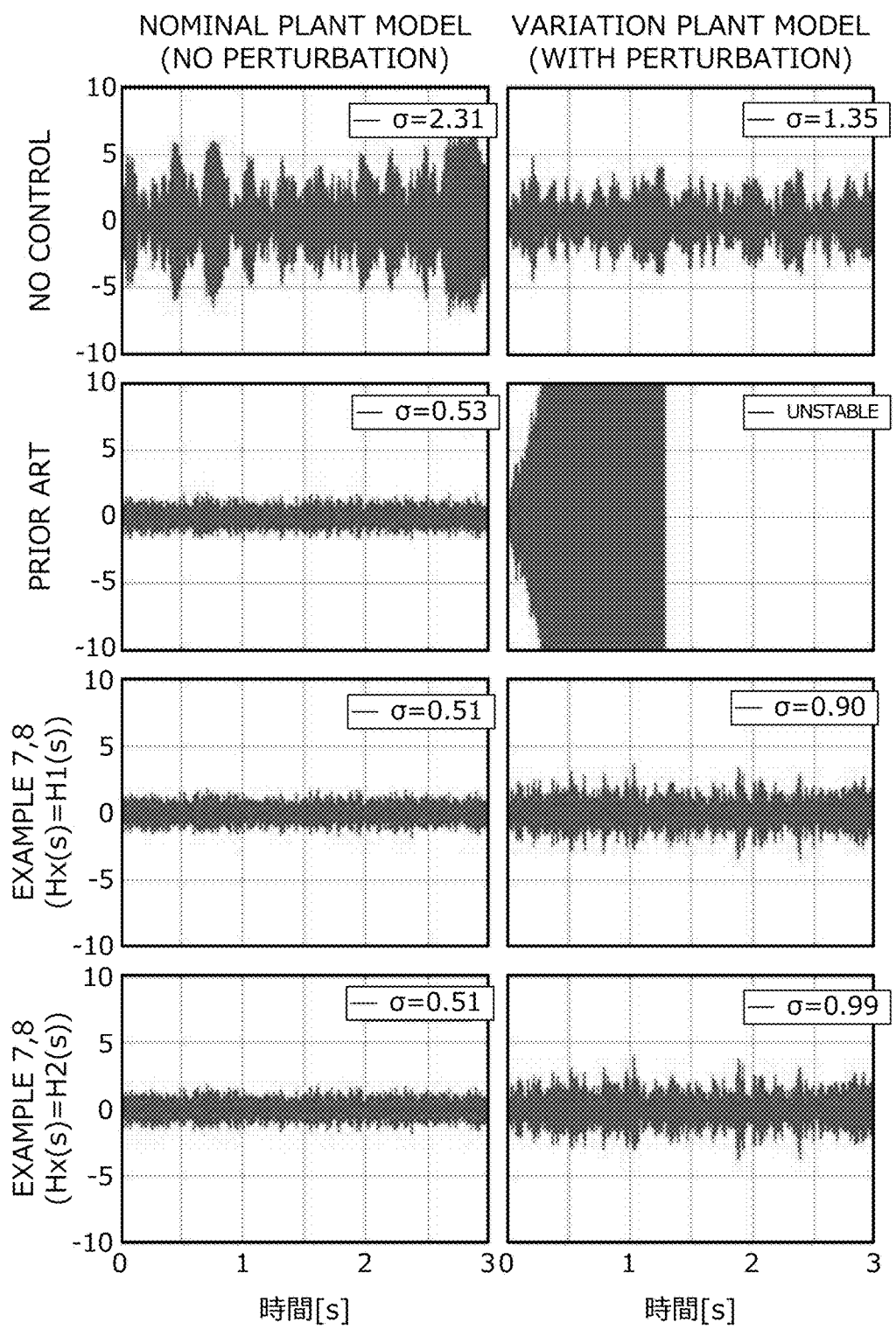
FIG. 20 provides graphs comparing the performance of the resonance suppression control circuits of Example 7 and 8.

FIG. 20 provides graphs comparing the performance of the resonance suppression control circuits of Example 7 and 8. FIG. 20 shows various responses in the case of inputting a random base torque command signal similarly to FIG. 8 into the resonance suppression control circuit. The column on the left side in FIG. 20 shows various responses in the case of establishing as the control target a nominal plant model obtained with the perturbation amount as 0 in the nominal model N7 of FIG. 17, and the column on the right side in FIG. 20 shows various responses in the case of establishing as the control target a variation plant model obtained with the perturbation amount as −0.5 in the nominal model N7. It should be noted that the topmost in FIG. 20 shows the change in shaft torque detection signal in an uncontrolled state, the second row from the top in FIG. 20 shows the results of the prior art resonance suppression control circuit, and the third and fourth rows from the top in FIG. 20 show the effects of the resonance suppression control circuit of Example 7 or Example 8 in the case of setting the function forms of Hx(s) as H1(s) and H2(s), respectively.

As shown in FIG. 20, the prior art resonance suppression control circuit exhibits sufficient resonance suppression function relative to the nominal plane model without perturbation; however, it does not exhibit sufficient resonance suppression function relative to the variation plant model in which fluctuation occurred from the nominal plant model at the resonance frequency of the low-order vibration mode, and control becomes unstable. In contrast, according to the resonance suppression control circuit of Example 7 or Example 8, in both of the nominal plant model (left side of FIG. 20) and variation plant model (right side of FIG. 20), the standard deviation amount of the shaft torque detection signal decreases from the uncontrolled state, and thus exhibits sufficient resonance suppression function. It should be noted that, even if selecting either of H1($s$) and H2($s$) as the function form of the high-order vibration mode transfer function, the standard deviation amount of the shaft torque detection signals are nearly equal, and thus considered to exhibit nearly equal resonance suppression function.

Example 9

Figure 21:
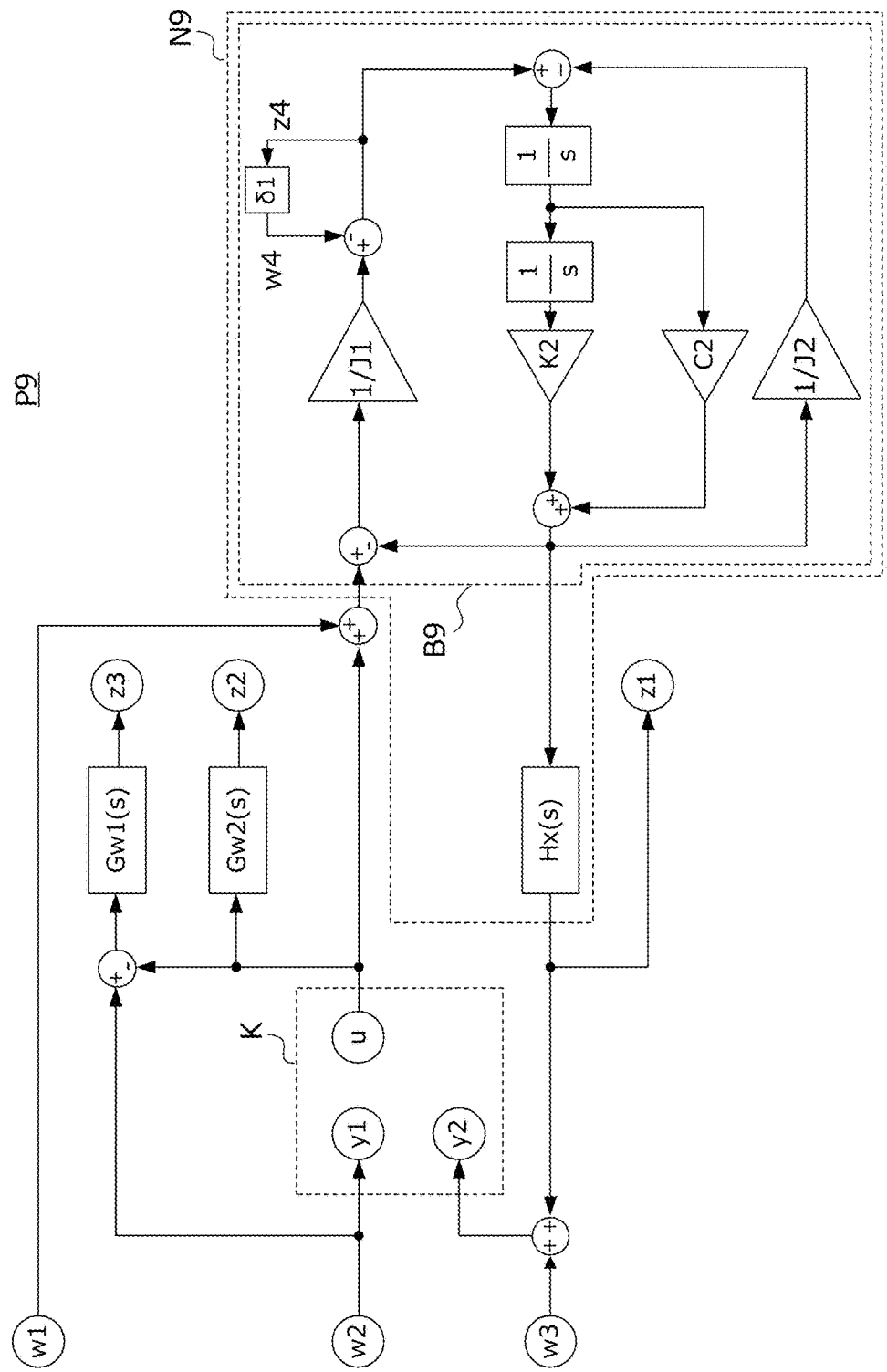
FIG. 21 is a view showing a specific configuration of a generalized plant used in the design of the resonance suppression control circuit of Example 9.

FIG. 21 is a view showing a specific configuration of a generalized plant P9 used in the design of the resonance suppression control circuit of Example 9.

As shown in FIG. 21, the generalized plant P9 according to Example 9 has a configuration of the block B9 representing the low-order vibration mode transfer function M2($s$) in the nominal model N9 which differs from the generalized plant P7 according to Example 7. More specifically, in the nominal model N9, the position at which setting the fourth external input w4, fourth control output z4 and first parameter perturbation term δ1 differs from the nominal model N1 according to Example 7, and other configurations are the same.

The fourth external input w4 and fourth control output z4 are set so as to apply multiplicative error to the first moment of inertia J1 having a correlation with the magnitude of the resonance frequency of the low-order vibration mode, among the plurality of parameters included in the low-order vibration mode transfer function M2($s$) having a low-order vibration mode as shown in FIG. 21. In addition, in order to configure so that a resonance suppression control circuit is obtained which is robustly stable relative to such multiplicative error of the first moment of inertia J1 the fluctuation directly on the resonance frequency of the low-order frequency mode, the first parameter perturbation term δ1 constituting one of the diagonal elements of the structured perturbation Δ is set between this fourth control output z4 and fourth external input w4. The resonance suppression control circuit of Example 9 is derived based on the μ design method using the generalized plant P9 in which structured perturbation Δ is stipulated in the above way.

Example 10

Figure 22:
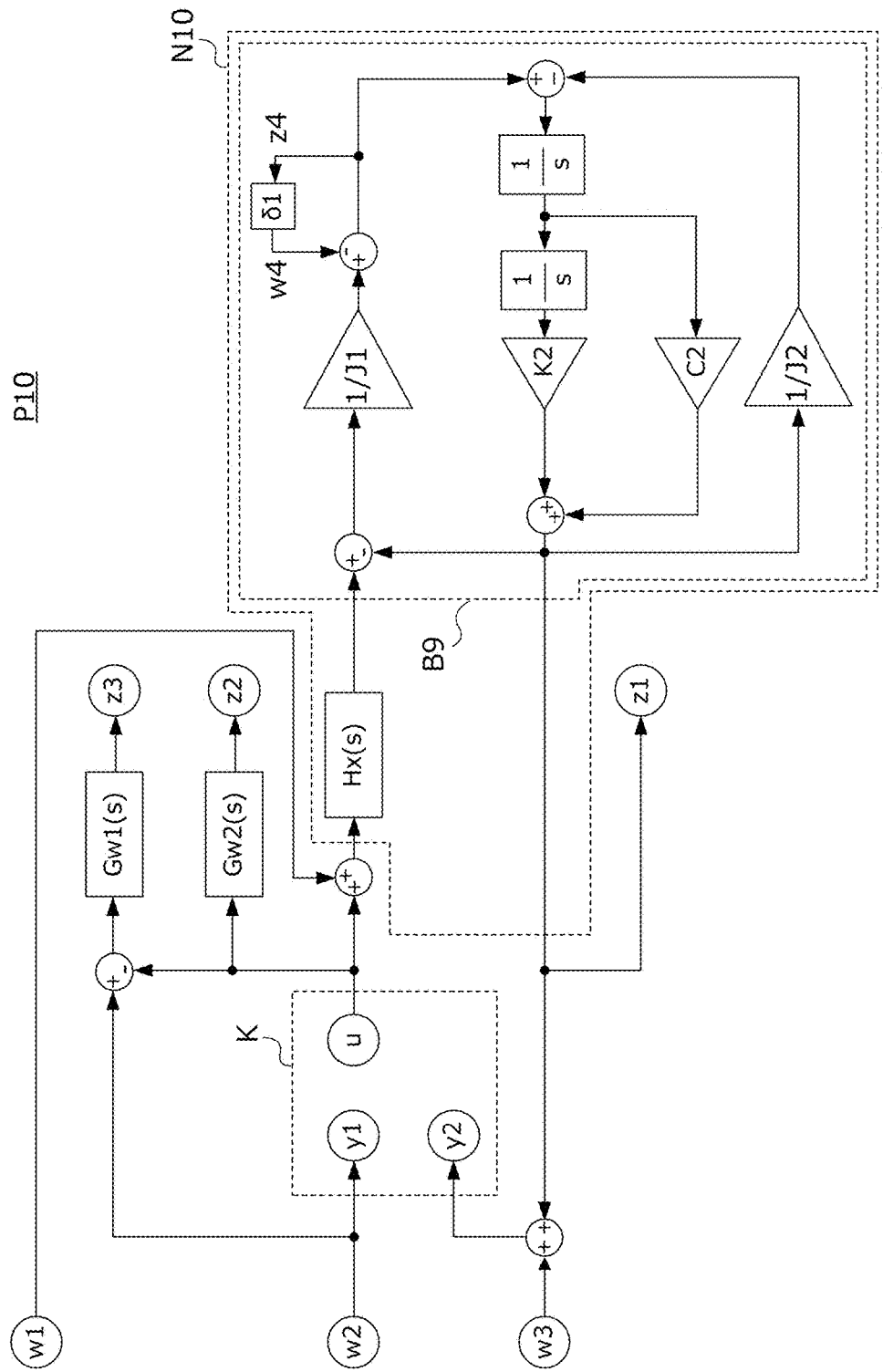
FIG. 22 is a view showing a specific configuration of a generalized plant used in the design of the resonance suppression control circuit of Example 10.

FIG. 22 is a view showing a specific configuration of a generalized plant P10 used in the design of the resonance suppression control circuit of Example 10.

The generalized plant P10 according to Example 10 has a configuration of the nominal model N10 which differs from the generalized plant P9 according to Example 9. More specifically, it differs in the point of the order of multiplying the high-order vibration mode transfer function Hx($s$) and the low-order vibration mode transfer function M2($s$) being opposite to the nominal model N9 according to Example 9, and the other configurations are the same. The resonance suppression control circuit of Example 10 is derived based on the μ design method using the generalized plant P10 in which structured perturbation Δ is stipulated in the above way.

Figure 23:
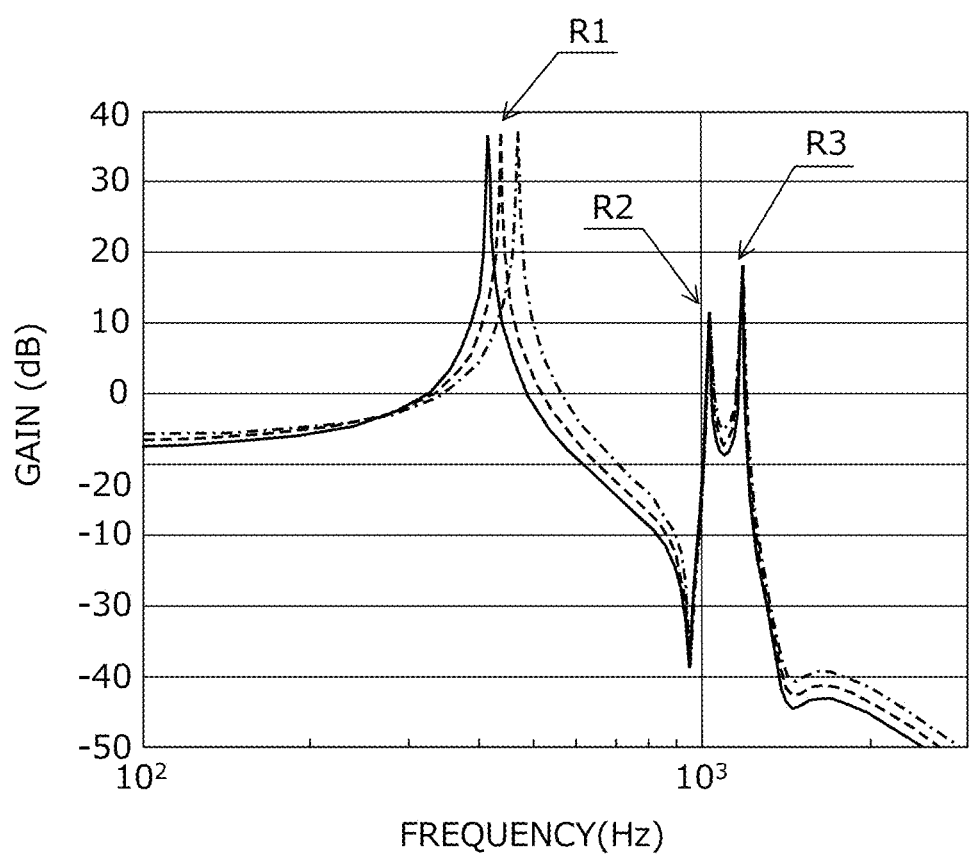
FIG. 23 is a Bode diagram from a base torque command signal until a shaft torque detection signal in a nominal model according to Examples 9 and 10.

FIG. 23 is a Bode diagram from a base torque command signal until a shaft torque detection signal in a nominal model according to Examples 9 and 10. It should be noted that, in the nominal model in which the first parameter perturbation term δ1 is set as shown in FIGS. 21 and 22, FIG. 23 shows model a setting the value of the perturbation amount as 0 by a solid line, shows a model setting the perturbation amount as +0.2 and increasing the unit moment of inertial J by 20% by a dotted line, and shows a model setting the perturbation amount as −0.2 and decreasing the unit moment of inertia J by −20% by a dashed line. It should be noted that, in FIG. 23, the function type of the high-order vibration mode transfer function Hx(s) was set as H1($s$) defined by formula (4).

As shown in FIG. 23, when varying the perturbation amount to the positive side, the resonance frequency of low-order vibration mode R1 varies to the low frequency side, and when varying the perturbation amount to the negative side, the resonance frequency of the low-order vibration mode R1 varies to the high frequency side. Therefore, according to the generalized plants of Examples 9 and 10, as shown in FIGS. 21 and 2, by setting the first parameter perturbation term δ1 so as to apply multiplicative error to the first moment of inertia J1 included in the low-order vibration mode transfer function M2, it is possible to construct a resonance suppression control circuit in which robust stability is ensured relative to fluctuation in resonance frequency of the low-order vibration mode R1 serving as the suppression target.

Figure 24:
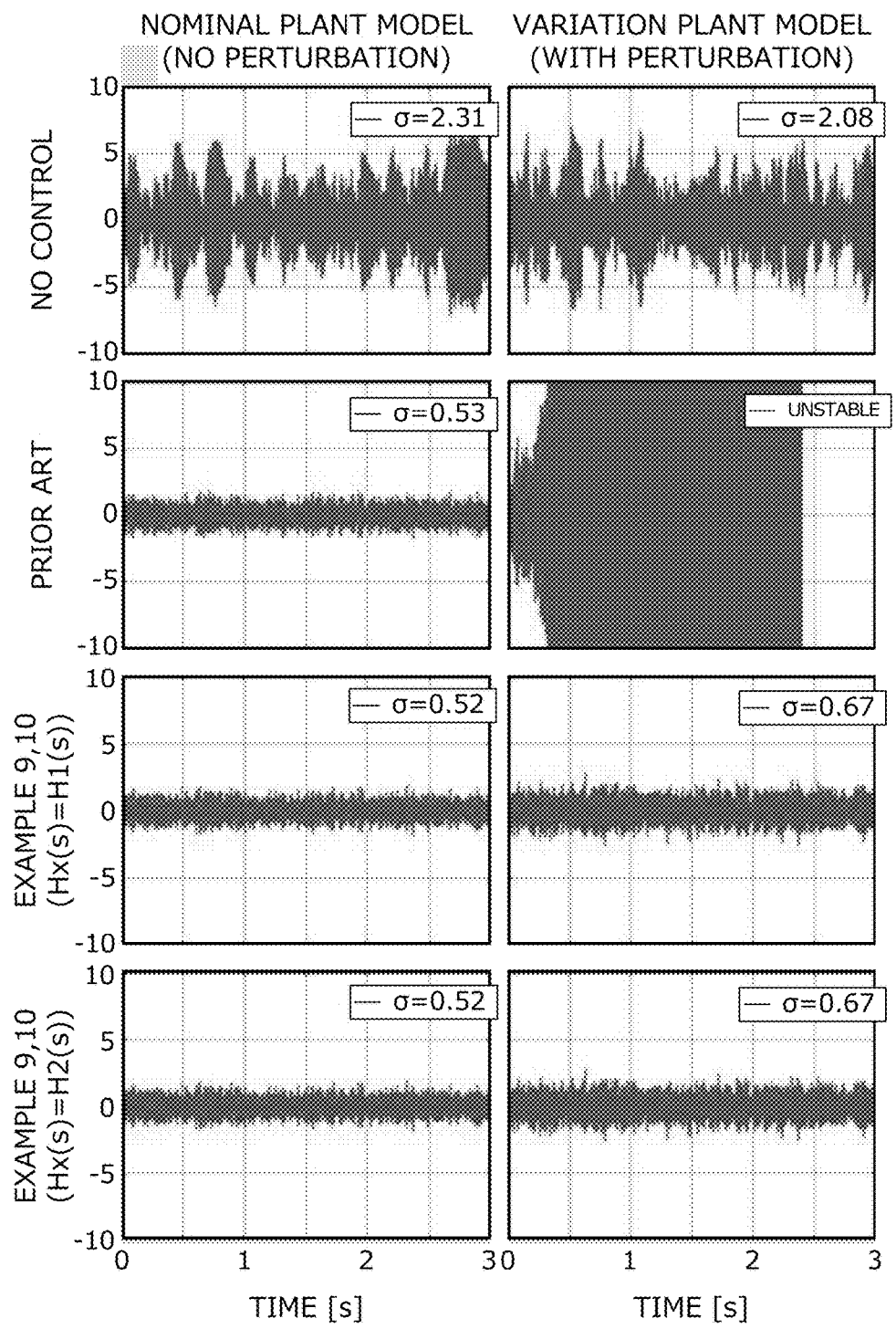
FIG. 24 provides graphs comparing the performance of the resonance suppression control circuits of Example 9 and 10.

FIG. 24 provides graphs comparing the performance of the resonance suppression control circuits of Example 9 and 10. FIG. 24 shows various responses in the case of inputting a random base torque command signal similarly to FIG. 8 into the resonance suppression control circuit. The column on the left side in FIG. 24 shows various responses in the case of establishing as the control target a nominal plant model obtained with the perturbation amount as 0 in the nominal model N9 of FIG. 21, and the column on the right side in FIG. 21 shows various responses in the case of establishing as the control target a variation plant model obtained with the perturbation amount as −0.3 in the nominal model N9. It should be noted that the topmost in FIG. 21 shows the change in shaft torque detection signal in an uncontrolled state, the second row from the top in FIG. 21 shows the results of the prior art resonance suppression control circuit, and the third and fourth rows from the top in FIG. 21 show the effects of the resonance suppression control circuit of Example 9 or Example 10 in the case of setting the function forms of Hx(s) as H1($s$) and H2($s$), respectively.

As shown in FIG. 24, the prior art resonance suppression control circuit exhibits sufficient resonance suppression function relative to the nominal plane model without perturbation; however, it does not exhibit sufficient resonance suppression function relative to the variation plant model in which fluctuation occurred from the nominal plant model at the resonance frequency of the low-order vibration mode, and control becomes unstable. In contrast, according to the resonance suppression control circuit of Example 9 or Example 10, in both of the nominal plant model (left side of FIG. 24) and variation plant model (right side of FIG. 24), the standard deviation amount of the shaft torque detection signal decreases from the uncontrolled state, and thus exhibits sufficient resonance suppression function. It should be noted that, even if selecting either of H1($s$) and H2($s$) as the function form of the high-order vibration mode transfer function, the standard deviation amount of the shaft torque detection signals are nearly equal, and thus considered to exhibit nearly equal resonance suppression function.

Example 11

Figure 25:
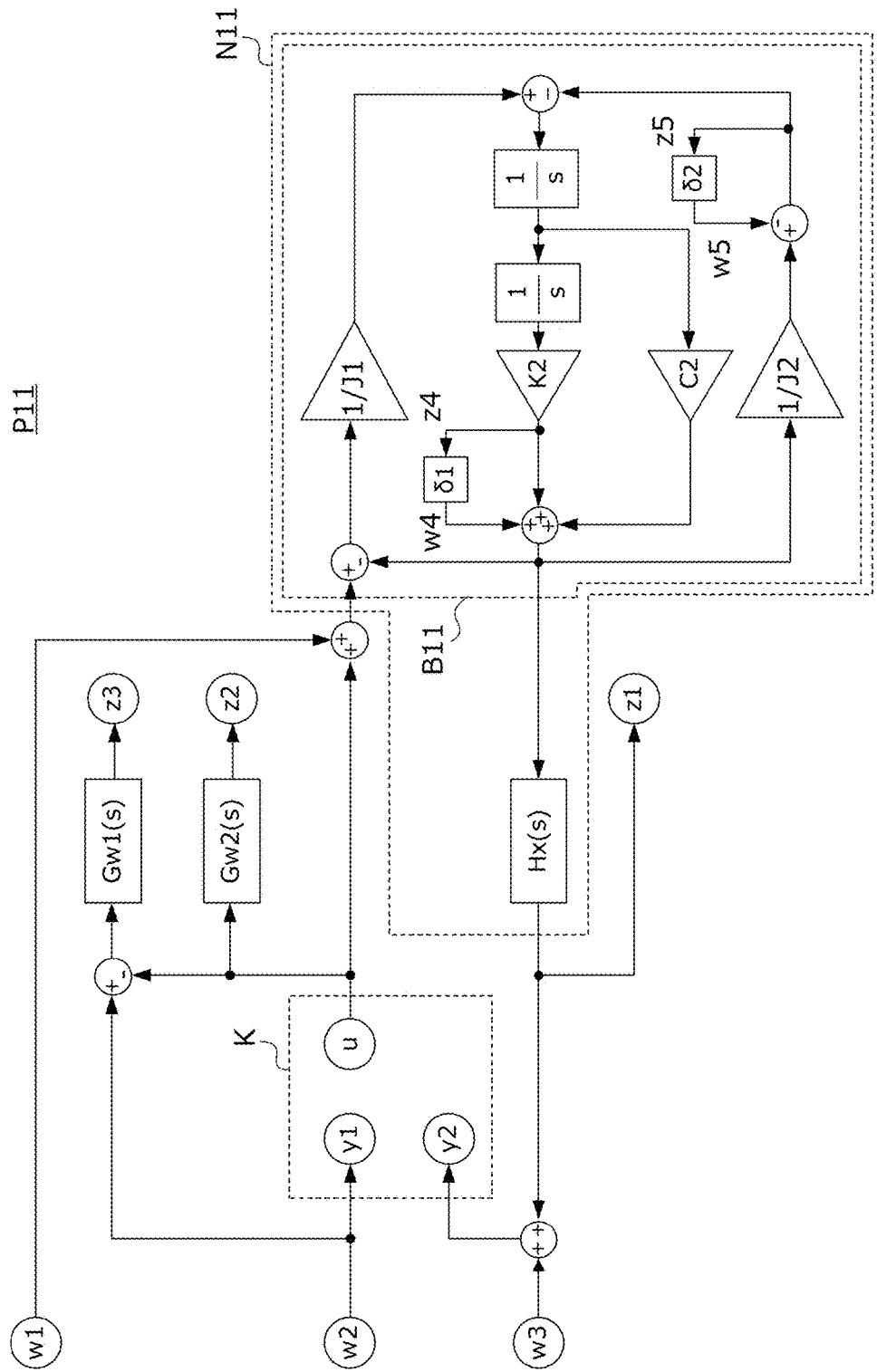
FIG. 25 is a view showing a specific configuration of a generalized plant used in the design of the resonance suppression control circuit of Example 11.

FIG. 25 is a view showing a specific configuration of a generalized plant P11 used in the design of the resonance suppression control circuit of Example 11.

As shown in FIG. 25, the generalized plant P11 according to Example 11 has a configuration of the block B11 representing the low-order vibration mode transfer function $M2(s)$ in the nominal model N11 which differs from the generalized plant P5 according to Example 5. More specifically, it differs from the nominal model N5 of Example 5 in the point of the fifth external input w5, fifth control output z5 and second parameter perturbation term $\delta 2$ being further set in this nominal model N11.

Among the plurality of parameters included in the low-order vibration mode transfer function $M2(s)$ having low-order vibration mode, the fifth external input w5 and fifth control output z5 are set so as to apply multiplicative error to this second moment of inertia J2, in the output terminal of the second moment of inertia having a correlation with the magnitude of the resonance frequency of the low-order vibration mode. In addition, in order to configure so that a resonance suppression control circuit is obtained which is robustly stable relative to multiplicative error in the second moment of inertia J2 which affects the fluctuation directly on the resonance frequency of the low-order vibration mode, the second parameter perturbation term $\delta 2$ constituting one of the diagonal elements of the structured perturbation $\Delta$ is set between this fifth control output z5 and fifth external input w5. The resonance suppression control circuit of Example 11 is derived based on the $\mu$ design method using the generalized plant P11 in which structured perturbation $\Delta$ is stipulated in the above way.

Example 12

Figure 26:
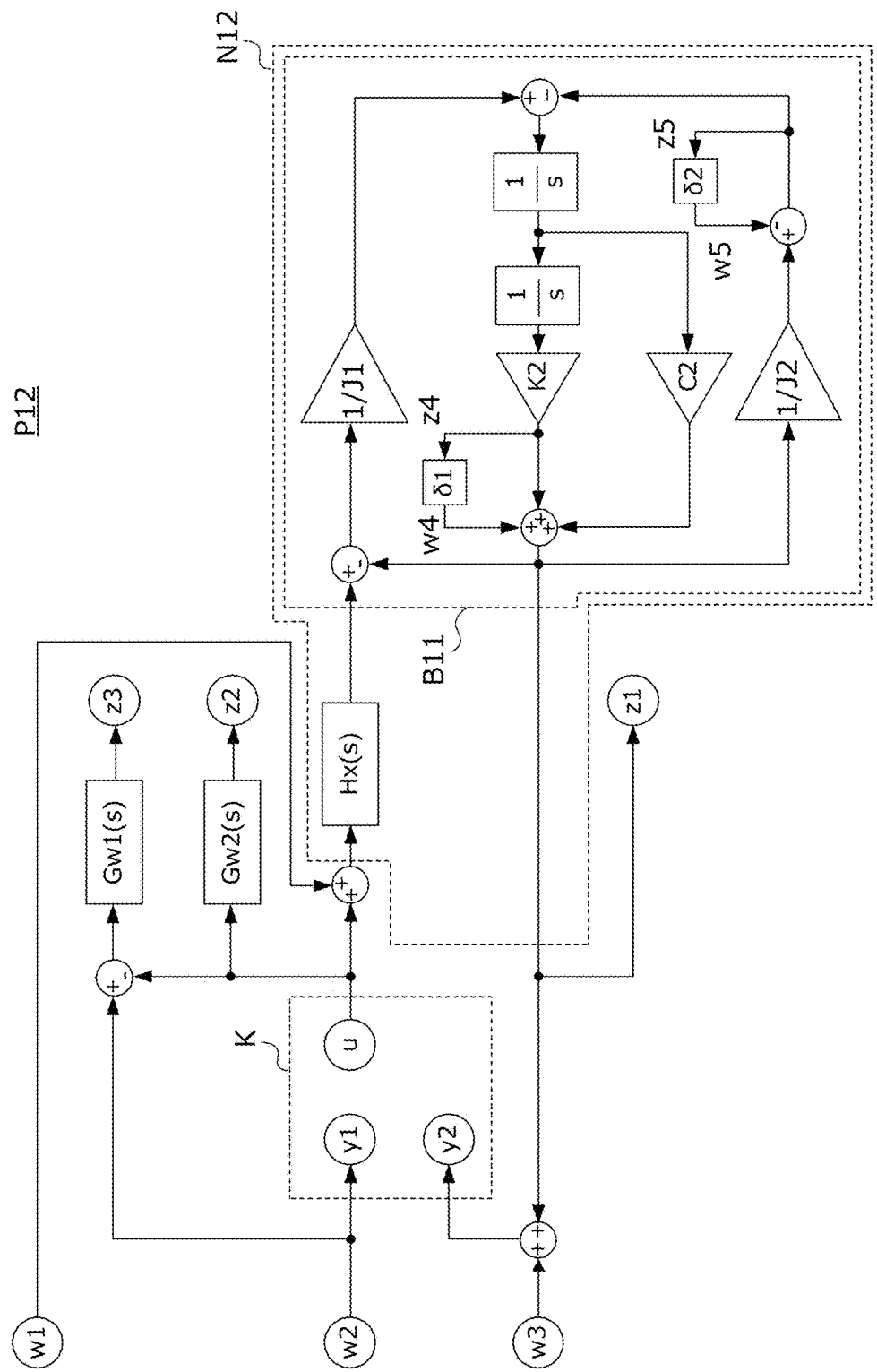
FIG. 26 is a view showing a specific configuration of a generalized plant used in the design of the resonance suppression control circuit of Example 12.

FIG. 26 is a view showing a specific configuration of a generalized plant P12 used in the design of the resonance suppression control circuit of Example 12.

The generalized plant P12 according to Example 12 has a configuration of the nominal model N12 which differs from the generalized plant P11 according to Example 11. More specifically, it differs in the point of the order of multiplying the high-order vibration mode transfer function Hx(s) and the low-order vibration mode transfer function $M2(s)$ being opposite to the nominal model N1 according to Example 11, and the other configurations are the same. The resonance suppression control circuit of Example 12 is derived based on the $\mu$ design method using the generalized plant P12 in which structured perturbation $\Delta$ is stipulated in the above way.

Figure 27:
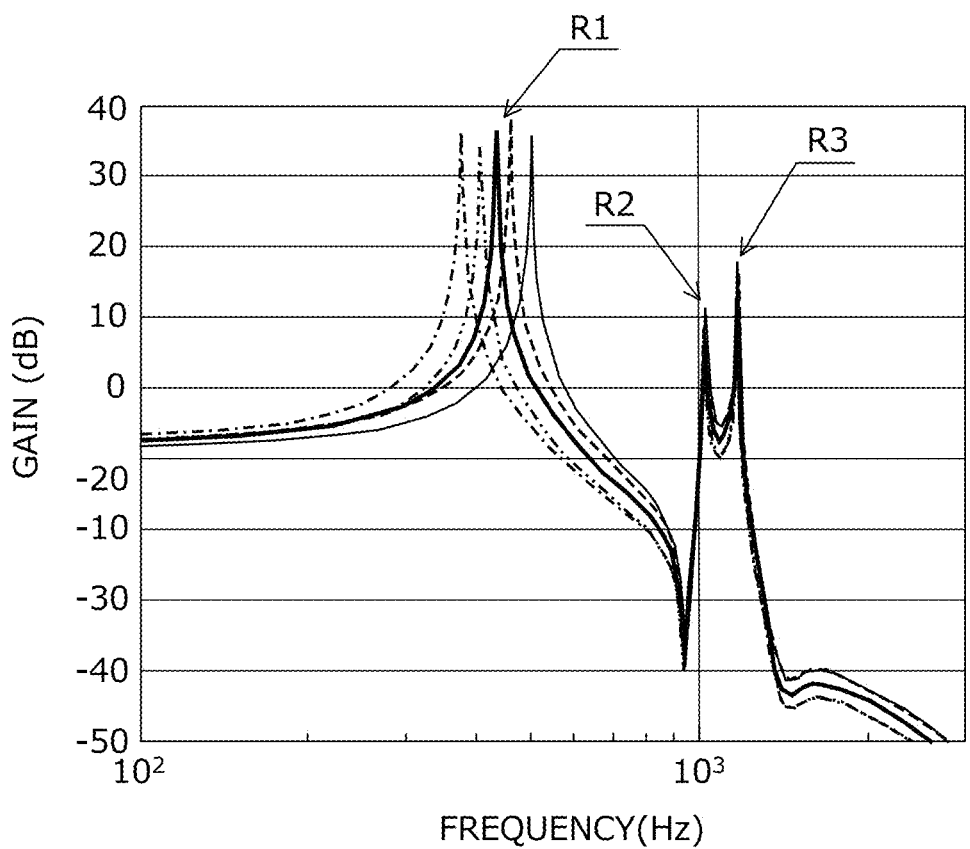
FIG. 27 is a Bode diagram from a base torque command signal until a shaft torque detection signal in a nominal model according to Examples 11 and 12.

FIG. 27 is a Bode diagram from a base torque command signal until a shaft torque detection signal in a nominal model according to Examples 11 and 12. It should be noted that FIG. 27 shows a model in which both the value of the first parameter perturbation term $\delta 1$ (hereinafter referred to as "first perturbation amount") and the value of the second parameter perturbation term $\delta 2$ (hereinafter referred to as "second perturbation amount") are set as 0 by a bold solid line. A model in which the first perturbation amount is set as +0.2, the spring constant K2 is increased by 20%, and the second perturbation amount is set as +0.2 and the second moment of inertia J2 is increased by 20% is shown by a dotted line. A model in which the first perturbation amount is set as −0.2, the spring constant K2 is decreased by −20%, and the second perturbation amount is set as +0.2 and the second moment of inertia J2 is increased by 20% is shown by a chain line. A model in which the first perturbation amount is set as −0.2, the spring constant K2 is decreased by −20%, and the second perturbation amount is set as −0.2 and the second moment of inertia J2 is increased by 20% is shown by a two-dot chain line. In addition, a model in which the first perturbation amount is set as +0.2, the spring constant K2 is increased by 20%, and the second perturbation amount is set as −0.2 and the second moment of inertia J2 is decreased by −20% is shown by a fine line.

As shown in FIG. 27, when increasing and decreasing the first and second perturbation amounts, although the resonance frequency of the low-order vibration mode R1 which is the lowest order among the three vibration modes R1 to R3 changes, the resonance frequencies of the high-order vibration modes R2 and R2 do not change. Therefore, according to the generalized plants of Examples 11 and 12, as shown in FIGS. 25 and 26, by setting the first and second parameter perturbation terms 61, 62 so as to apply multiplicative error to the spring constant K2 and second moment of inertia J2 included in the low-order vibration mode transfer function M1, it is possible to construct a resonance suppression control circuit in which robust stability is ensured relative to fluctuation in resonance frequency of the low-order vibration mode R1 serving as the suppression target.

Figure 28:
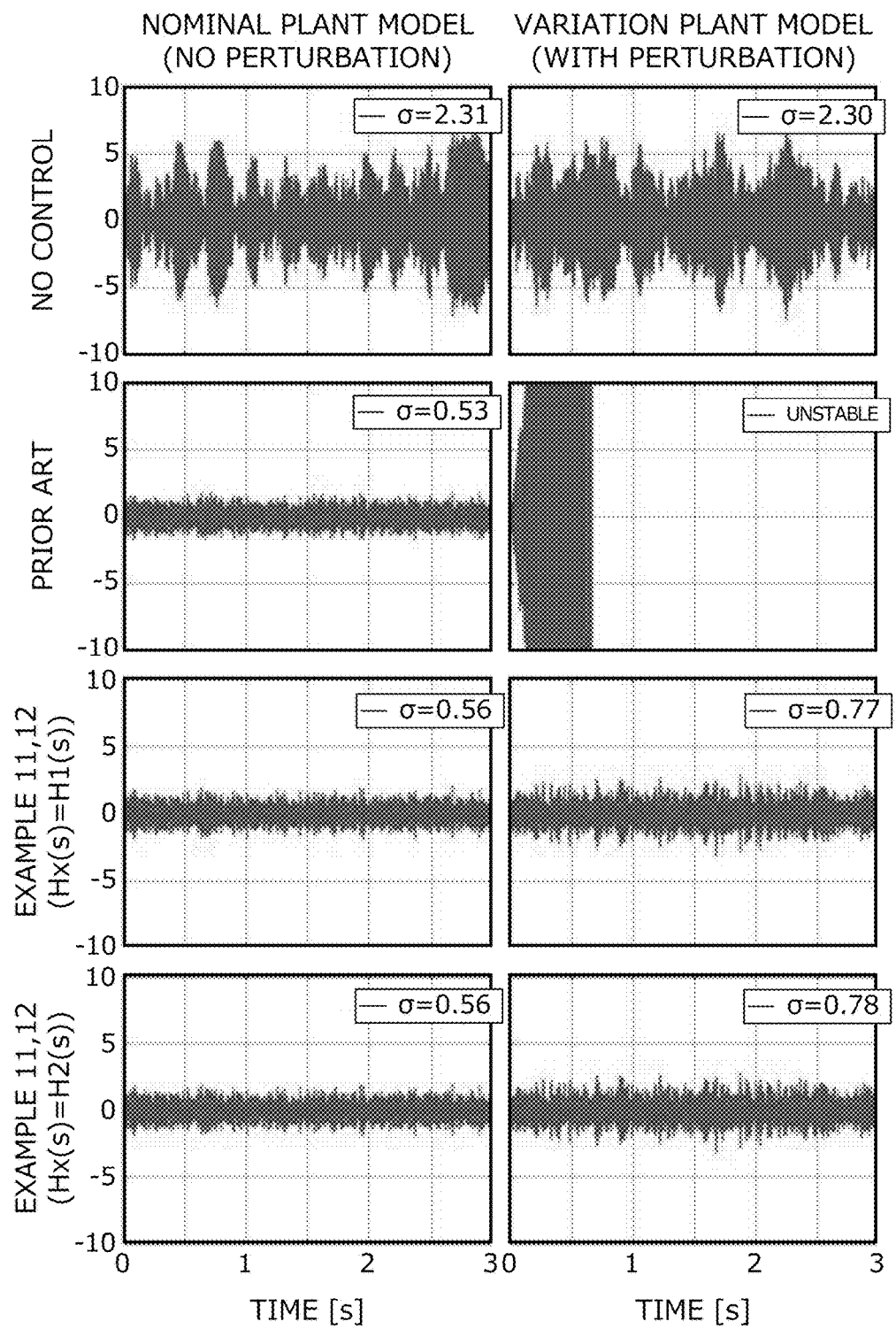
FIG. 28 provides graphs comparing the performance of the resonance suppression control circuits of Example 11 and 12.

FIG. 28 provides graphs comparing the performance of the resonance suppression control circuits of Example 11 and 12. FIG. 28 shows various responses in the case of inputting a random base torque command signal similarly to FIG. 8 into the resonance suppression control circuit. The column on the left side in FIG. 28 shows various responses in the case of establishing as the control target a nominal plant model obtained with the first and second perturbation amounts both as 0 in the nominal model N11 of FIG. 25, and the column on the right side in FIG. 25 shows various responses in the case of establishing as the control target a variation plant model obtained with the first perturbation amount as +0.2 and the second perturbation amount as −0.2 in the nominal model N11. It should be noted that the topmost in FIG. 28 shows the change in shaft torque detection signal in an uncontrolled state, the second row from the top in FIG. 28 shows the results of the prior art resonance suppression control circuit, and the third and fourth rows from the top in FIG. 28 show the effects of the resonance suppression control circuit of Example 11 or Example 12 in the case of setting the function forms of Hx(s) as $H1(s)$ and $H2(s)$, respectively.

As shown in FIG. 28, the prior art resonance suppression control circuit exhibits sufficient resonance suppression function relative to the nominal plane model without perturbation; however, it does not exhibit sufficient resonance suppression function relative to the variation plant model in which fluctuation occurred from the nominal plant model at the resonance frequency of the low-order vibration mode, and control becomes unstable. In contrast, according to the resonance suppression control circuit of Example 11 or Example 12, in both of the nominal plant model (left side of FIG. 28) and variation plant model (right side of FIG. 28), the standard deviation amount of the shaft torque detection signal decreases from the uncontrolled state, and thus exhibits sufficient resonance suppression function. It should be noted that, even if selecting either of $H1(s)$ and $H2(s)$ as the function form of the high-order vibration mode transfer function, the standard deviation amount of the shaft torque detection signals are nearly equal, and thus considered to exhibit nearly equal resonance suppression function.

Although an embodiment of the present invention has been explained above, the present invention is not to be limited thereto. The configurations of each part may be modified as appropriate within the scope of the gist of the present invention. For example, in the above-mentioned embodiment, a case of applying the resonance suppression control circuits of Examples 1 to 12 to a drive train bench system establishing the drive train of a vehicle as the test piece was explained; however, the present invention is not to be limited thereto. In other words, the resonance suppression control circuits of Examples 1 to 12 may be applied to a so-called engine bench system which establishes the engine of a vehicle as the test piece.

EXPLANATION OF REFERENCE NUMERALS

S test system
S1 connecting shaft (shaft)
W, W' test piece
2 drive motor (electric motor)
5 resonance suppression control circuit
6 shaft torque meter
R1 low-order vibration mode
R2, R3 high-order vibration mode
P1~P12 generalized plant
N1~N12 nominal model
M1($s$), M2($s$) low-order vibration mode transfer function (suppression target vibration mode transfer function)
Hx(s) high-order vibration mode transfer function
Gc1($s$), Gc2($s$) controller
Δ structured perturbation
δ1 first parameter perturbation term (perturbation term)
δ2 second parameter perturbation term (perturbation term)

The invention claimed is:

1. A resonance suppression control circuit which, establishing a physical system having a plurality of at least two vibration modes configured by connecting an electric motor and a test piece by a shaft, suppresses resonance in at least one vibration mode among the plurality of vibration modes by applying an input to the electric motor,
wherein the resonance suppression control circuit comprises a controller designed by way of a control system design method designated as μ design method using a generalized plant which includes a nominal model imitating input/output characteristics of the control target from an input of the electric motor until shaft torque of the shaft, and a structured perturbation relative to the generalized plant,
wherein the nominal model defines one among the plurality of vibration modes as a suppression target, and is represented by the product of a suppression target vibration mode transfer function having a vibration mode of the suppression target, and a high-order vibration mode transfer function having a vibration mode which is higher order than the vibration mode of the suppression target, and
wherein the structured perturbation includes at least one perturbation term relative to a parameter included in the suppression target vibration mode transfer function.

2. The resonance suppression control circuit according to claim 1, wherein a transfer function from an input to an inertia field until an output of a shaft element in a one-degree-of-freedom vibration system configured by connecting the inertia field having a predetermined moment of inertia and a solid wall by the shaft element having a predetermined spring constant and damping constant, is used in the suppression target vibration mode transfer function.

3. The resonance suppression control circuit according to claim 2, wherein the structured perturbation includes a perturbation term relative to the spring constant.

4. The resonance suppression control circuit according to claim 2, wherein the structured perturbation includes a perturbation term relative to the moment of inertia.

5. The resonance suppression control circuit according to claim 2, wherein, when defining a pole of the suppression target vibration mode transfer function as "pR" and defining a complex conjugate thereof as "pR*", the spring constant K1, the damping constant C1 and the suppression target vibration mode transfer function M1($s$) are represented by Formula (1) below $$K1 = p_R \cdot p_R^*,\ C1 = -(p_R + p_R^*),\ M1(s) = \frac{C1 \cdot s + K1}{(s - p_R) \cdot (s - p_R^*)}. \quad (1)$$

6. The resonance suppression control circuit according to claim 2, wherein the high-order vibration mode transfer function is identified so that a transfer function obtained by multiplying this high-order vibration mode transfer function and the suppression target vibration mode transfer function matches a transfer function from an input to the electric motor of the suppression target until a shaft torque of the shaft.

7. A test system comprising:
an electric motor which is connected with a test piece via a shaft;
a shaft torque meter which detects shaft torque generated at the shaft;
an inverter which supplies electric power to the electric motor; and
a resonance suppression control circuit which generates, using a command signal relative to generated torque of the electric motor and a detection signal of the shaft torque meter, a torque current command signal to the electric motor so that resonance of the shaft is suppressed, and then inputs the torque current command signal to the inverter,
wherein a resonance suppression control circuit according to claim 2 is used as the resonance suppression control circuit.

8. The resonance suppression control circuit according to claim 1, wherein a transfer function from an input to a first inertia field until an output of a shaft element in a two inertia system configured by connecting the first inertia field having a predetermined first moment of inertia and a second inertia field having a predetermined second moment of inertia by the shaft element having a predetermined spring constant and damping constant, is used in the suppression target vibration mode transfer function.

9. The resonance suppression control circuit according to claim 8, wherein the structured perturbation includes a perturbation term relative to the spring constant.

10. The resonance suppression control circuit according to claim 8, wherein the structured perturbation includes a perturbation term relative to the second moment of inertia.

11. The resonance suppression control circuit according to claim 8, wherein the structured perturbation includes a perturbation term relative to the first moment of inertia.

12. The resonance suppression control circuit according to claim 8, wherein the structured perturbation includes a perturbation term relative to the spring constant and a perturbation term relative to the second moment of inertia.

13. The resonance suppression control circuit according to claim 8, wherein, when defining a pole of the suppression target vibration mode transfer function as "$p_R$", defining a complex conjugate thereof as "$p_R^*$", defining the first moment of inertia as "J1" and defining the second moment of inertia as "J2", the spring constant K2, the damping constant C2 and the suppression target vibration mode transfer function M2(s) are represented by Formula (2) below $$K2 = \frac{p_R \cdot p_R^*}{\frac{1}{J1} + \frac{1}{J2}}, C2 = -\frac{p_R + p_R^*}{\frac{1}{J1} + \frac{1}{J2}}, M2(s) = \frac{1}{J1} \cdot \frac{C2 \cdot s + K2}{(s - p_R) \cdot (s - p_R^*)}. \quad (2)$$

14. A test system comprising:
an electric motor which is connected with a test piece via a shaft;
a shaft torque meter which detects shaft torque generated at the shaft;
an inverter which supplies electric power to the electric motor; and
a resonance suppression control circuit which generates, using a command signal relative to generated torque of the electric motor and a detection signal of the shaft torque meter, a torque current command signal to the electric motor so that resonance of the shaft is suppressed, and then inputs the torque current command signal to the inverter,
wherein a resonance suppression control circuit according to claim 13 is used as the resonance suppression control circuit.

15. The resonance suppression control circuit according to claim 8, wherein the high-order vibration mode transfer function is identified so that a transfer function obtained by multiplying this high-order vibration mode transfer function and the suppression target vibration mode transfer function matches a transfer function from an input to the electric motor of the suppression target until a shaft torque of the shaft.

16. A test system comprising:
an electric motor which is connected with a test piece via a shaft;
a shaft torque meter which detects shaft torque generated at the shaft;
an inverter which supplies electric power to the electric motor; and
a resonance suppression control circuit which generates, using a command signal relative to generated torque of the electric motor and a detection signal of the shaft torque meter, a torque current command signal to the electric motor so that resonance of the shaft is suppressed, and then inputs the torque current command signal to the inverter,
wherein a resonance suppression control circuit according to claim 8 is used as the resonance suppression control circuit.

17. The resonance suppression control circuit according to claim 1, wherein the high-order vibration mode transfer function is identified so that a transfer function obtained by multiplying this high-order vibration mode transfer function and the suppression target vibration mode transfer function matches a transfer function from an input to the electric motor of the suppression target until a shaft torque of the shaft.

18. A test system comprising:
an electric motor which is connected with a test piece via a shaft;
a shaft torque meter which detects shaft torque generated at the shaft;
an inverter which supplies electric power to the electric motor; and
a resonance suppression control circuit which generates, using a command signal relative to generated torque of the electric motor and a detection signal of the shaft torque meter, a torque current command signal to the electric motor so that resonance of the shaft is suppressed, and then inputs the torque current command signal to the inverter,
wherein a resonance suppression control circuit according to claim 17 is used as the resonance suppression control circuit.

19. A test system comprising:
an electric motor which is connected with a test piece via a shaft;
a shaft torque meter which detects shaft torque generated at the shaft;
an inverter which supplies electric power to the electric motor; and
a resonance suppression control circuit which generates, using a command signal relative to generated torque of the electric motor and a detection signal of the shaft torque meter, a torque current command signal to the electric motor so that resonance of the shaft is suppressed, and then inputs the torque current command signal to the inverter,
wherein a resonance suppression control circuit according to claim 1 is used as the resonance suppression control circuit.

20. A method of designing a resonance suppression control circuit which, establishing a physical system configured by connecting an electric motor and a test piece by a shaft, and having a plurality of at least two vibration modes as a control target, suppresses resonance in at least one vibration mode among the plurality of vibration modes by applying an input to the electric motor, the method comprising:
defining one among the plurality of vibration modes as a suppression target, and stipulating a generalized plant which includes nominal model imitating input/output characteristics of the control target from an input to the electric motor until a shaft torque of the shaft, by a product of a suppression target vibration mode transfer function having a vibration mode of the suppression target, and a high-order vibration mode transfer function having a vibration mode which is higher order than the vibration mode of the suppression target;
stipulating a structured perturbation which includes at least one perturbation term relative to a parameter included in the suppression target vibration mode transfer function in the generalized plant; and
designing the resonance suppression control circuit by way of a suppression system design method designated as pt design method using the stipulated generalized plant and structured perturbation.

* * * * *